(12) United States Patent
Furuichi et al.

(10) Patent No.: US 8,930,368 B2
(45) Date of Patent: Jan. 6, 2015

(54) CATEGORIZING DATA TO PERFORM ACCESS CONTROL

(75) Inventors: Sanehiro Furuichi, Tokyo (JP); Hideo Ichinomiya, Yamato (JP); Hayato Kiriyama, Yamato (JP); Masami Tada, Kanagawa (JP); Taku Aratsu, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/335,906

(22) Filed: Dec. 22, 2011

(65) Prior Publication Data

US 2012/0166442 A1 Jun. 28, 2012

(30) Foreign Application Priority Data

Dec. 27, 2010 (JP) ................................ 2010-290465

(51) Int. Cl.
*G06F 7/00* (2006.01)
*G06F 17/30* (2006.01)
*G06F 21/62* (2013.01)

(52) U.S. Cl.
CPC ...... *G06F 17/30707* (2013.01); *G06F 21/6227* (2013.01)
USPC ............. 707/740; 707/781; 707/791; 705/51; 726/3; 726/16; 726/27

(58) Field of Classification Search
None
See application file for complete search history.

(56) References Cited

U.S. PATENT DOCUMENTS

| 6,233,618 | B1 * | 5/2001 | Shannon ........................ 709/229 |
| 7,568,235 | B2 * | 7/2009 | Bird et al. ........................ 726/27 |
| 7,624,424 | B2 * | 11/2009 | Morita et al. ....................... 726/1 |
| 2003/0061166 | A1 * | 3/2003 | Saito et al. ........................ 705/54 |
| 2004/0193915 | A1 * | 9/2004 | Smith et al. .................... 713/200 |
| 2005/0060566 | A1 * | 3/2005 | Chebolu et al. ............... 713/200 |
| 2007/0061487 | A1 * | 3/2007 | Moore et al. ....................... 726/5 |
| 2007/0113293 | A1 * | 5/2007 | Blumenau ........................ 726/27 |

(Continued)

FOREIGN PATENT DOCUMENTS

| JP | 2000112993 | 4/2000 |
| JP | 2000285140 | 10/2000 |

(Continued)

OTHER PUBLICATIONS

"Adobe Live Cycle Rights Management ES2", Obtained from Internet: http://www.adobe.com/products/livecycle/rightsmanagement/Dec. 13, 2010 , 3 pages.

(Continued)

*Primary Examiner* — Debbie Le
*Assistant Examiner* — Hasanul Mobin
(74) *Attorney, Agent, or Firm* — DeLizio Gilliam, PLLC

(57) ABSTRACT

At least one of data, an indication of the data, and metadata associated with the data is received at a first computing system, wherein the data is to be categorized. It is determined that at least part of the data is not to be categorized by the first computing system. In response to a determination that at least part of the data is not to be categorized by the first computing system, it is determined that a second computing system is indicated for categorization of the data and at least one of the data, an indication of the data, and the metadata associated with the data is transmitted from the first computing system to the second computing system.

19 Claims, 13 Drawing Sheets

(56) References Cited

U.S. PATENT DOCUMENTS

| | | | |
|---|---|---|---|
| 2007/0299828 A1* | 12/2007 | Lewis et al. | 707/3 |
| 2008/0155663 A1* | 6/2008 | Knowlson et al. | 726/5 |
| 2010/0257127 A1 | 10/2010 | Owens | |

FOREIGN PATENT DOCUMENTS

| | | |
|---|---|---|
| JP | 2001203747 | 7/2001 |
| JP | 2001306593 | 11/2001 |
| JP | 2002373117 | 12/2002 |
| JP | 2003099400 | 4/2003 |
| JP | 2006012117 | 1/2006 |
| JP | 2007334588 | 12/2007 |
| JP | 2008015953 | 1/2008 |
| JP | 2008191812 | 8/2008 |
| JP | 2008191813 | 8/2008 |
| JP | 2010212404 | 9/2010 |
| WO | 2010041744 | 4/2010 |

OTHER PUBLICATIONS

Yanagita, et al., "An Evaluation Method of Appropriate Ahemative Texts Described fur Web Images", IEICE technical support, 2009, 6 pages.

\* cited by examiner

PRINT
PRINTER NAME: PRINTER 1
PRINTER 1
PRINTER 2
IN-HOUSE PRINTER PENDING (DURING CATEGORIZATION OF DEPARTMENT A SECRET)
PRINTER IN DEPARTMENT B (DURING CATEGORIZATION OF DEPARTMENT A SECRET)

PRINT
PRINTER NAME: PRINTER 1
PRINT RANGE: ⦿ ALL
○ CURRENT PAGE
○ SELECTED PORTION
○ PAGES SPECIFIED

ONLY FIRST PAGE IS PRINTABLE (DURING CATEGORIZATION OF DEPARTMENT A SECRET)

IBM Lotus Symphony

BECAUSE DEPARTMENT A SECRET IS BEING CATEGORIZED, SAVING C:\temp\aaa.doc IS TEMPORARILY BLOCKED

CATEGORIZATION STATUS: COMPANY SECRET> DEPARTMENT A SECRET (DURING CATEGORIZATION)

1105

CATEGORIZATION POLICY 1201

```xml
<?xml version="1.0" encoding="utf-8"?>
<DiscoveryPolicy>
<Description>Discover Company Confidential</Description>
<FileType>
<Extension>doc</Extension>
<Extension>xls</Extension>
<Extension>ppt</Extension>
<Extension>odt</Extension>
<Extension>odp</Extension>
<Extension>ods</Extension>
<Extension>txt</Extension>
</FileType>
<ScanSchedule>
<StartTime>2010-01-01T03:00:00</StartTime>
<Frequency>Monthly</Frequency>
</ScanSchedule>
<classificationRules>
<ContentCategory>CampanyConfidential</ContentCategory>
<classifier>
<DataType>text</DataType>
<decisionPlan>DPforTextualData</decisionPlan>
</classifier>
<classifier>
<DataType>picture</DataType>
<decisionPlan>DPforPicture</decisionPlan>
</classifier>
<classifier>
<DataType>movie</DataType>
<decisionPlan>DPforMovie</decisionPlan>
</classifier>
</classificationRules>
<classificationRules>
<!-- Any other classification rules could be described here -->
</classificationRules>
</DiscoveryPolicy>
```

ACCESS CONTROL POLICY 1202

```xml
<?xml version="1.0" encoding="utf-8"?>
<EnforcementPolicy>
<PolicySet>
<Description>Policies for Confidential Category</Description>
<Policy>
<Target>
<Resource>
<ContentCategory>CompanyConfidential</ContentCategory>
</Resource>
<Action>
<AttributeValue id="action">write</Value>
<AttributeValue id="device">network</Value>
</Action>
</Target>
<RuleEffect="Pending"/>
<Obligations>
<Obligation Obligationid="display message nonintrusive" FulfillOn="Pending"/>
</Obligations>
</Policy>
<Policy>
<Target>
<Resource>
<ContentCategory>DepartmentConfidential</ContentCategory>
</Resource>
<Action>
<AttributeValue id="action">write</Value>
<AttributeValue id="device">network</Value>
</Action>
</Target>
<RuleEffect="Deny"/>
<Obligations>
<Obligation Obligationid="audit" FulfillOn="Deny"/>
<Obligation Obligationid="display message intrusive" FulfillOn="Deny"/>
</Obligations>
</Policy>
</PolicySet>
<PolicySet>
<!-- Policy sets for any other categories could be described here -->
</PolicySet>
</EnforcementPolicy>
```

FIG. 12

CATEGORIZING DATA TO PERFORM ACCESS CONTROL

CROSS-REFERENCE TO RELATED APPLICATIONS

This application claims priority from Japanese Patent Application No. 2010290465, filed on Dec. 27, 2010.

BACKGROUND

1. Technical Field

Embodiments of the inventive subject matter generally relate to the field of computers, and, more particularly, to categorizing data maintained by such computers to perform access control.

2. Description of Related Art

In content-aware DLP (Data Loss Protection or Data Leakage Prevention) for analyzing the content of data (e.g. document file) to determine the confidentiality level, the time required for analysis processing cannot be ignored. For example, based on the confidentiality level of data, when real-time access control is performed, on an end point, on a user action (e.g. file copy, move or printout) that leads to information leakage, the analysis processing becomes a bottleneck. Further, in the case of a client computer that assumes interactive operations on a graphical user interface (GUI) base (e.g. Windows®), delay in the analysis processing causes reduction in usability.

From the viewpoint of security, it is common practice to tighten access control of data whose confidentiality level is undetermined. However, excessive access control will disturb user convenience.

SUMMARY

Embodiments generally include a method comprising receiving, at a first computing system, at least one of data, an indication of the data, and metadata associated with the data. The data is to be categorized. It is determined that at least part of the data is not to be categorized by the first computing system. In response to a determination that at least part of the data is not to be categorized by the first computing system, it is determined that that a second computing system is indicated for categorization of the data and at least one of the data, an indication of the data, and metadata associated with the data to the second computing system is transmitted from the first computing system to the second computing system.

Embodiments categorize files for access control. As part of the categorization process, a system receives first data, where the first data comprises at least one of a portion of data to be categorized and an attribute of the data to be categorized. The system determines that the first data belongs to a first category. In response to a determination that the first data belongs to a first category, the system applies a first access control set to actions on the data to be categorized. Further, the system determines that one or more of the actions on the data to be categorized has an access control status of pending. In response to a determination that one or more of the actions on the data to be categorized has an access control status of pending, the system receives second data, where the second data comprises at least one of a portion of the data to be categorized and an attribute of the data to be categorized. The system determines that the second data belongs to a second category. In response to a determination that the second data belongs to a second category, the system applies a second access control set to at least one of the actions having the access control status of pending.

BRIEF DESCRIPTION OF THE DRAWINGS

The present embodiments may be better understood, and numerous objects, features, and advantages made apparent to those skilled in the art by referencing the accompanying drawings.

FIG. 11 contains diagrams showing examples of displaying that categorization processing and access control are being dynamically performed on an application using a GUI according to embodiments of the inventive subject matter; and FIG. 12 shows an example of a categorization policy and an access control policy used in embodiments of the inventive subject matter,

DESCRIPTION OF EMBODIMENT(S)

Figure 1:
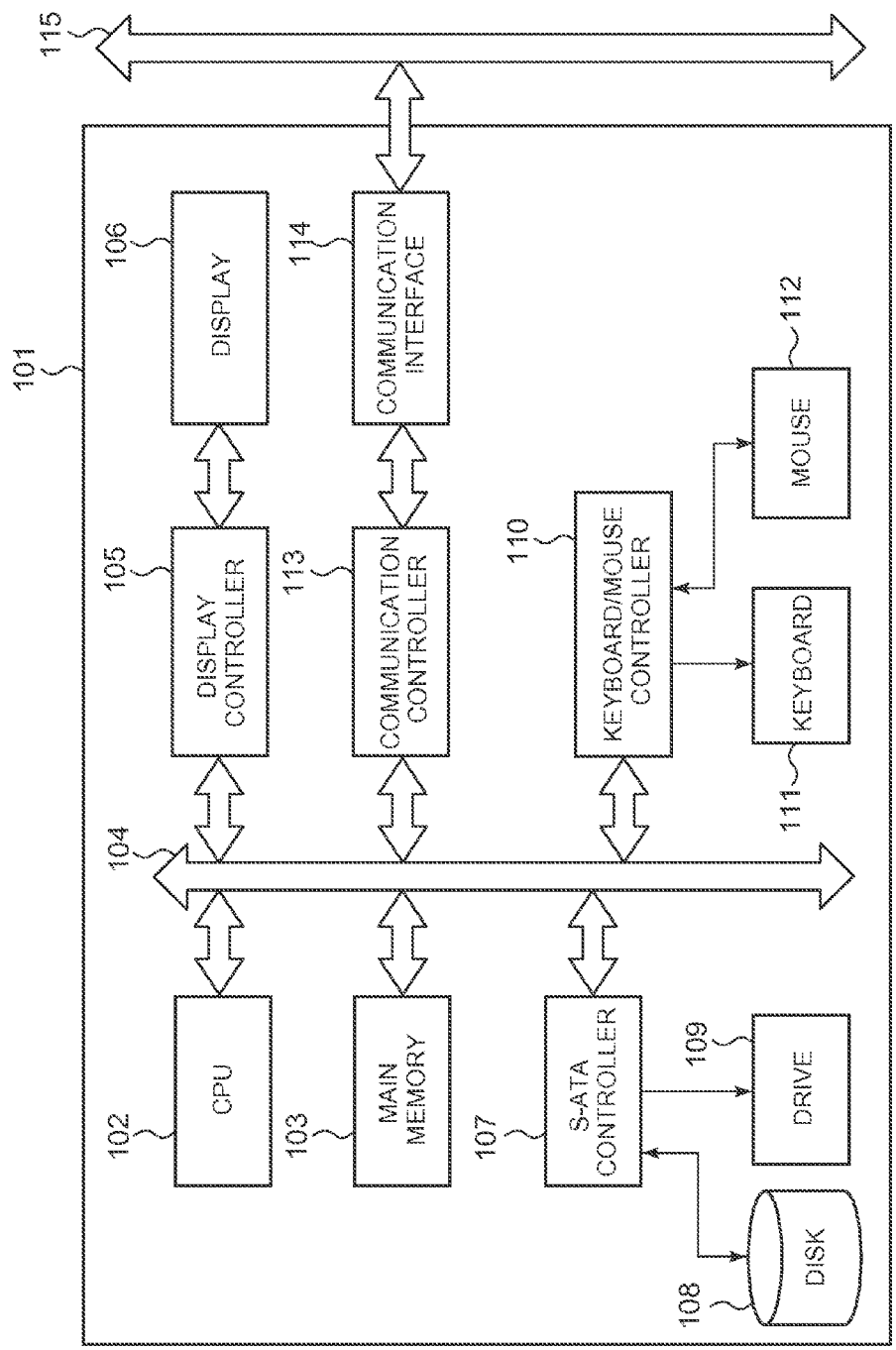
FIG. 1 is a basic block diagram of computer hardware used in embodiments of the inventive subject matter.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

The embodiments of the inventive subject matter relate to a technique for access control of user actions on data. Particularly, the embodiments of the inventive subject matter relate to a technique for dynamically categorizing data to perform access control.

Embodiments will now be described with reference to the accompanying drawings. Throughout the drawings, the same reference numerals denote the same elements unless otherwise noted.

FIG. 1 is a basic block diagram of computer hardware used in embodiments of the inventive subject matter.

A computer (101) includes a CPU (102) and a main memory (103), which are coupled to a bus (104). In various embodiments the CPU (102) may be based on a 32 bit or 64 bit architecture. For example, Intel® Core i® series, Core 2® series, Atom® series, Xeon® series, Pentium® series, or Celeron® series, or AMD Phenom® series, Athlon® series, Turion® series, or Sempron® can be used. A display (106) such as a liquid crystal display (LCD) can be coupled to the bus through a display controller (105). The display (106) is used to display, via an appropriate graphic interface, information on computers connected to a network through a communication line to manage the computers and information on software running on the computers. A disk (108) such as a hard disk or a silicon disk and a drive (109) such as a CD, DVD, or BD drive can also be coupled to the bus (104) through a BATA or ME controller (107). Further, a keyboard (111) and a mouse (112) can be coupled to the bus (104) through a keyboard/mouse controller (110) or a USB bus (not shown).

An operating system, programs for providing a Java® computing environment such as J2EE, Java® application, Java® virtual machine (VM), and a Java® just-in-time (JIT) compiler, other programs, and data may be stored on the disk (108) and can be loaded into the main memory (103).

The drive (109) is used to install a program from a CD-ROM, a DVD-ROM, or a BD onto the disk (108) as needed.

Figure 2:
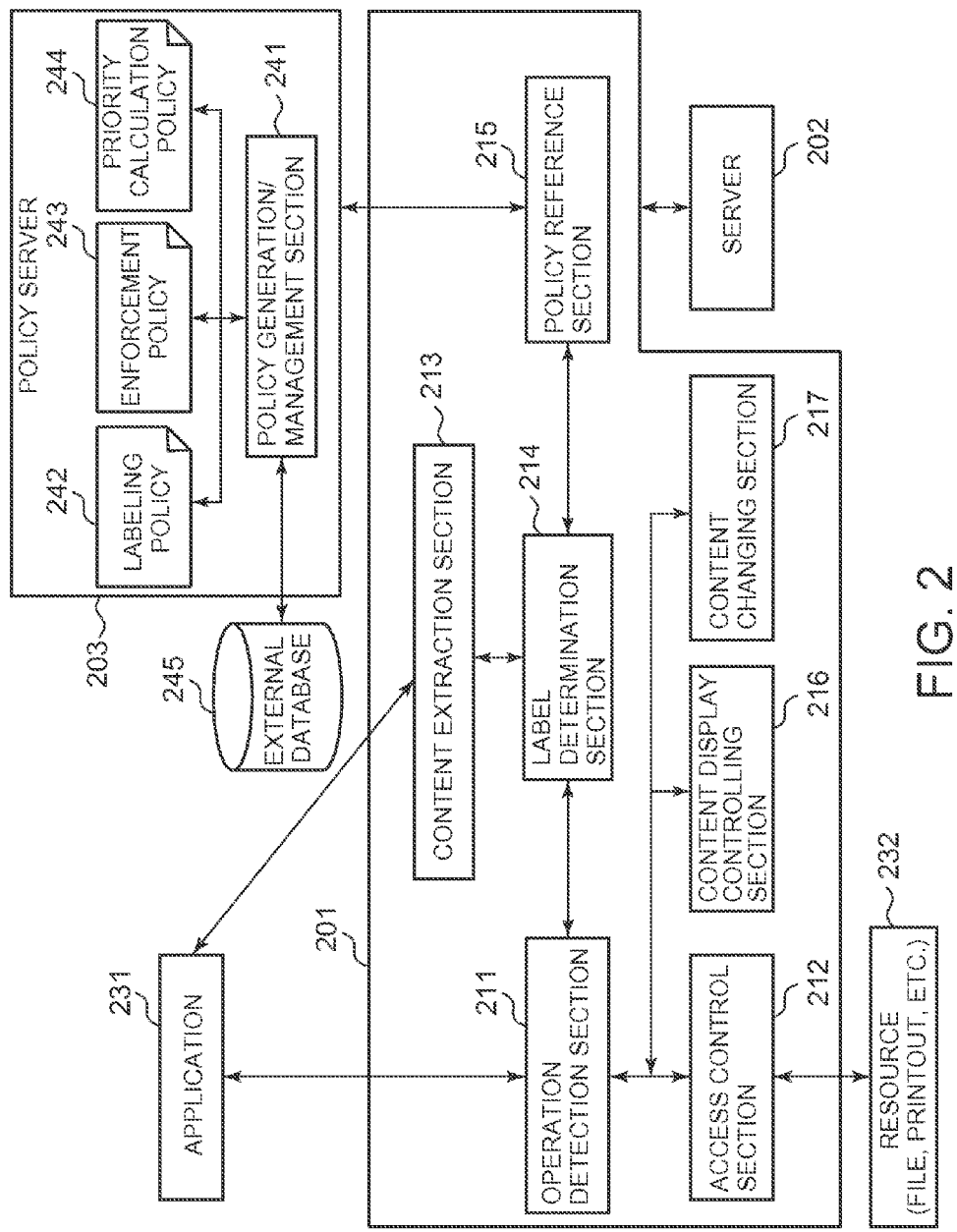
FIG. 2 is a functional block diagram of a client computer having the hardware functions of the computer shown in FIG. 1 and used in embodiments of the inventive subject matter.

A communication interface (114) follows, for example, the Ethernet® protocol. The communication interface (114) is coupled to the bus (104) through a communication controller (113) to take a role in coupling the computer (101) to a communication line (115), providing a network interface layer to the TCP/IP communication protocol as the communication function of the operating system on the computer (101). The communication line may be in a wired LAN environment or a wireless LAN environment based on a wireless LAN standard such as IEEE802.11a/b/g/n, FIG 2 is a functional block diagram of a client computer (201) having the hardware functions of the computer (101) shown in FIG. 1 and used in various embodiments of the inventive subject matter.

The client computer (also referred to as the "client") (201) can be a computer subject to data access control. For example, the client (201) can include, in addition to the CPU (102), the main memory (103), and the disk (108) shown in FIG. 1, an operation detection section (211), an access control section (212), a content extraction section (213), a label determination section (214), a policy reference section (215), a content display controlling section (216), and a content changing section (217). In some embodiments, the client (201) can be a standalone computer. If the client (201) is a client in a server/client environment, the client (201) can be coupled to a server computer (202) (also referred to as a "server") through a network (wired or wireless). The server (202) can be an intermediate server or an enterprise server.

Application software (231) (also referred to as an "application" or "applications") runs on the client (201). In the specification, the applications (231) include the operating system.

The operation detection section (211) detects a user operation on an application and specifies data as the target of the user operation. The data can be data or part of data to be categorized, such as the content of a file or part of the content in the file. The type of file is not particularly limited. The user operation may include input related to performing an operation such as printing or browsing data, copying to an external or internal medium, or an electronic mail transmission. In some embodiments, the operation detection section (211) makes an inquiry to the label determination section 214 about the availability of a confidential label of data related to the user operation.

The access control section (212) enables or disables the user action according to an access control set applied to the user action on the data or part of the data to be categorized. The access control section (212) references an enforcement policy (243) acquired by the policy reference section (215) to deny or permit the user operation detected by the operation detection section (211) based on the determination result from the label determination section (214).

In response to detection of a requested user operation by the operation detection section (211), the content extraction section (213) extracts data as the basis of categorization from the data that is the target of the user operation (i.e., the data to be categorized) or an attribute (also called static information) of the data to be categorized. Specifically, the content extraction section (213) extracts an attribute of the data on which the requested operation is performed, or the context or content included in the data. The attribute is, for example, the data (file) name, the data (file) extension, the creation date and time of the data (file), the modification date and time of the data (file), the directory name, or the name of a user who most recently accessed the data (file). The context is, for example, the frequency of update, the working time, a state in the workflow, the presence or absence of processes running, the user role, or the location. The content is, for example, text, an image, or video.

The content extraction section (213) also extracts content from a document file, a print command, or the content of a memory or screen display used, for example, in determining a confidential label, and provides it to the label determination section (214). Specifically, in response to acquisition of content by the content extraction section (213), the label determination section (214) categorizes the content into a predetermined type based on first labeling policy information included in labeling policy information acquired by the policy reference section (215). Then, the label determination section (214) determines a confidential label corresponding to the predetermined type of content based on second labeling policy information included in the labeling policy information acquired by the policy reference section (215) to determine a confidential label of the data.

In some embodiments, when two or more content portions are included in the data, the label determination section (214) makes confidential label determinations on the two or more content portions, respectively, and determines a confidential label with the highest confidentiality level among the confidential labels obtained by the determinations to be the confidential label of the data. Further, in response to extraction of data as the basis of categorization by the content extraction section (213), the label determination section (214) determines a confidential label corresponding to the data based on policy information acquired by the policy reference section (215).

Further, the label determination section (214) can acquire the latest labeling policy from the policy reference section (215) to check the data extracted by the content extraction section (213) using the latest labeling policy acquired in order to determine a confidential label of the extracted data. The label determination section (214) can cache the determination result or the policy. In response to extraction of content by the content extraction section (213), the label determination section (214) can determine a confidential label corresponding to data based on policy information acquired by the policy reference section (215).

The policy reference section (215) can acquire a categorization policy (341 in FIG. 3A) and an access control policy (342 in FIG. 31) through a policy generation/management section (241) provided in a policy server (203). The policy reference section (215) can also acquire a labeling policy (242), an enforcement policy (243), or a priority calculation policy (244) through the policy generation/management section (241) provided in the policy server (203). The labeling policy is a policy defining a content-based confidential label assignment rule, The enforcement policy is a policy defining the content control carried out according to the confidential label, The priority calculation policy (244) is a policy for calculating scan priority of a document to which the confidential label is to be given. The policy reference section (215) passes the acquired policy to the label determination section (214).

The content display controlling section (216) references the enforcement policy (243) acquired by the policy reference section (215) to control the display of the content based on the determination result produced by the label determination section (214). The display of the content can be controlled, for example, by hiding part of or the entire content, masking pan of or the entire content, or displaying a header, footer, or the like to indicate that the content is confidential information.

The content changing section (217) references the enforcement policy (243) acquired by the policy reference section (215) to update the content (document file data) based on the determination result by the label determination section (214). Specifically, for example, the content changing section (217) changes part of or the entire content permanently, or embeds, in the header, the footer, or the like, information indicative of a confidential label.

Thus, the access control section (212), the content display controlling section (216), and the content changing section (217) perform control according to the enforcement policy (243) depending on the confidential label given to the document according to the labeling policy (242).

In some embodiments, the operation detection section (211), the access control section (212), the content extraction section (213), the label determination section (214), the policy reference section (215), the content display controlling section (216), and the content changing section (217) can be implemented in plug-in software of an application (231), a filter driver, an application program interface (API) monitoring module, or the application (231) itself.

The client (201) can be coupled to a server (202) through a network, The configuration of the server (202) will he described later with reference to FIG. 3B.

The client (201) can also be coupled to the policy server (203). The policy server (203) can include the policy generation/management section (241).

The policy generation/management section (241) generates and manages the labeling policy (242) and the enforcement policy (243), The policy generation/management section (241) also references external information (e.g. in one or more external databases) as needed to generate the labeling policy in real time, The policy generation/management section (241) can be coupled to an external database (245).

Figure 3A:
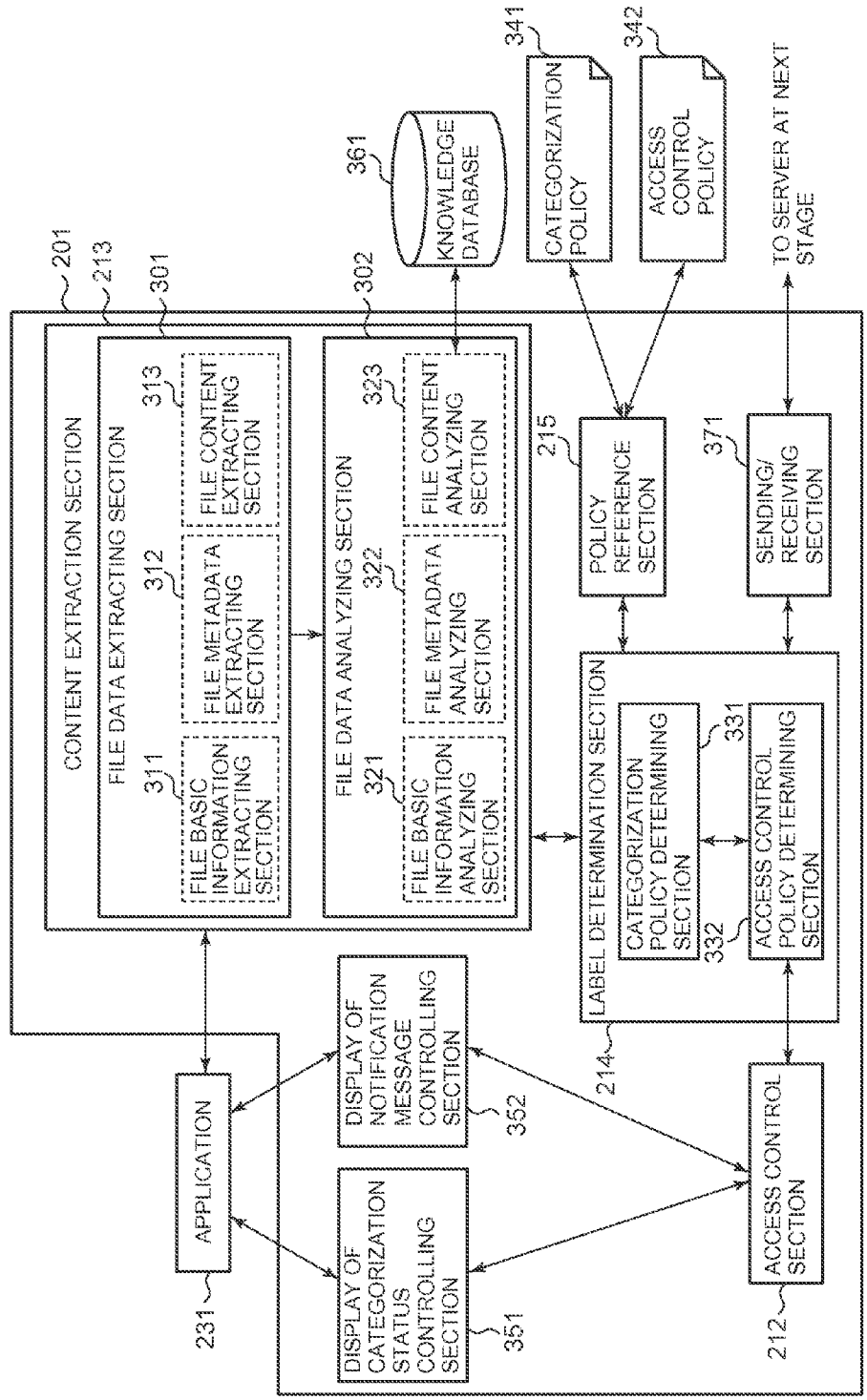
FIG. 3A is a diagram, which indicates that the client computer shown in FIG. 2 and used in embodiments of the inventive subject matter further includes a display of categorization status controlling section and a display of notification message controlling section, and also shows a detailed block diagram of a content extraction section and a label determination section included in the client computer.

FIG. 3A is a diagram, which not only indicates that the client (201) shown in FIG. 2 and used in various embodiments further includes a display of categorization status controlling section and a display of notification message controlling section, but also shows a detailed block diagram of the content extraction section (213) and the label determination section (214) included in the client (201) of some embodiments.

In some embodiments, the content extraction section (213) of the client (201) can further include a file data extracting section (301) and a file data analyzing section (302).

The file data extracting section (301) can include a file basic information extracting section (311), a file metadata extracting section (312), or a file content extracting section (313), or a combination of any of these sections. In general, it is desirable that resources for extracting basic information, metadata, and a content of a file have higher processing power in this order. In other words, if they are processed in the same resource hardware, the processing times required to extract the basic information, metadata, and content of the file become longer in this order. Therefore, for example, in various embodiments, the configuration can be such that the client (201) includes the file basic information extracting section (311), an intermediate server includes the file metadata extracting section (312), and an enterprise server includes the file content extracting section (313). In other words, the configuration has a computer with high processing power performing tasks that require a long time to extract data. For example, in embodiments where the client (201) is a computer with low processing power such as a personal digital assistant (PDA), a smartphone, or a netbook, the client (201) can include the file basic information extracting section (311) while other computers perform content extraction.

The file basic information extracting section (311) extracts basic information included in the data to be categorized (e.g. a document file or partial data on the document file) and on which the requested operation detected by the operation detection section (211) has been performed. The basic information includes, for example, the file name of the data to be categorized, the file extension, or the modification date and time. The basic information may be data capable of being categorized in a short time.

The file metadata extracting section (312) references the categorization policy (341) acquired by the policy reference section (215) to extract metadata included in the data to be categorized. The metadata is, for example, metadata on the file itself (e.g. metadata specific to a creator, an administrator, or the application), or metadata managed on an enterprise content management (ECM) server (e.g. the workflow state or the frequency of update).

The file content extracting section (313) references the categorization policy (341) acquired by the policy reference section (215) to extracts content included in the data to be categorized. The content is, for example, text, an image, video, or sound.

The file data analyzing section (302) can include a file basic information analyzing section (321), a file metadata analyzing section (322), a file content analyzing section (323), or a combination of any of these sections. In general, it is desirable that resources for analyzing basic information, metadata, and a content of a file have higher processing power in this order.

In other words, if the information, metadata and content were to be processed in the same resource hardware, the processing times required to analyze the basic information, metadata, and content of the file becomes longer in this order. Therefore, for example, in various embodiments, the configuration can be such that the client (201) includes the file basic information analyzing section (321), the intermediate server includes the file metadata analyzing section (322), and the enterprise server includes the file content analyzing section (323). In other words, the configuration has a computer with high processing power perform tasks that require a long time to analyze data. For example, in embodiments where the client (201) is a computer with low processing power such as a personal digital assistant (PDA), a smartphone, or a netbook, the client (201) can include only the file basic information analyzing section (321).

The file basic information analyzing section (321) references the categorization policy (341) acquired by the policy reference section (215) to analyze basic information extracted by the file basic information extracting section (311). The analysis of basic information can be, for example, rule-based analysis. In the case of rule-based analysis, it means that a meaningful unit of words is determined to acquire a segmented data value.

The file metadata analyzing section (322) analyzes metadata extracted by the metadata extracting section (312). The analysis of metadata can be, for example, rule-based analysis.

The file content analyzing section (323) analyzes a content extracted by the file content extracting section (313). The analysis of a content means the data is categorized based on the content extracted by the file content extracting section (313). The analysis of content can be, for example, rule-based analysis or knowledge-based. analysis. The knowledge-based analysis is to analyze data that cannot be categorized by a simple rule, In the knowledge-based analysis, a large number of data sets are given to the file content analyzing section (323). The file content analyzing section (323) can learn the large number of data sets and use a knowledge database (361) to calculate to which category the extracted content is relatively close or with which category the extracted content has a higher degree of association. The file content analyzing section (323) can be connected to the knowledge database (361) to perform the knowledge-based analysis.

The label determination section (214) of the client (201) can include a categorization policy determining section (331) and an access control policy determining section (332).

The categorization policy determining section (331) references the categorization policy (341) acquired by the policy reference section (215) to categorize the data to be categorized using the analysis result from the file basic information analyzing section (321), the analysis result from one or more of the file metadata analyzing section (322), or the analysis result from the file content analyzing section (323). In the case of rule-based analysis, the categorization means that conditional determination processing is performed based on a defined categorization rule from a data value obtained as a result of analysis by the analysis section (321, 322, or 323) to acquire a categorization result. Note that the file basic information analyzing section (321), the file metadata analyzing section (322), or the file content analyzing section (323) may have the function of the categorization policy determining section (331), respectively.

The access control policy determining section (332) references the access control policy (342) acquired by the policy reference section (215) to determine access control, to be applied to the content, according to the categorization result by the categorization policy determining section (331). The access control policy determining section (332) passes the determination result to the access control section (212).

Using the determination result from the access control policy determining section (332), the access control section (212) performs access control of a user action on the content. Using the determination result from the access control policy determining section (332), the access control section (212) also instructs a display of categorization status controlling section (351) to show a user the categorization status, for example through an application (231). Further, using the determination result from the access control policy determining section (332), the access control section (212) instructs a display of notification message controlling section (352) to show the user a notification message through the application (231).

In addition to the functions shown in FIG. 2, the client (201) can further include the display of categorization status controlling section (351) and the display of notification message controlling section (352).

Using a system tray or an application extension point (e.g. plug-in), the display of categorization status controlling section (351) shows the user of the client (201) that categorization processing is being performed on the data to be categorized (for example, see FIGS. 11B, 11C, and 11E to be described later).

The display of notification message controlling section (352) shows the user of the client (201) the result of access control over the user operation (for example, see FIGS. 11A and 11D). The result of access control indicates, for example, that an access restriction is imposed on the action on the data to be categorized or what kind of access restriction is placed.

Further, the client (201) includes a sending/receiving section (371) for sending the data to be categorized to the server (202) as a node of the next stage and receiving the categorization result from the server (202).

Figure 3B:
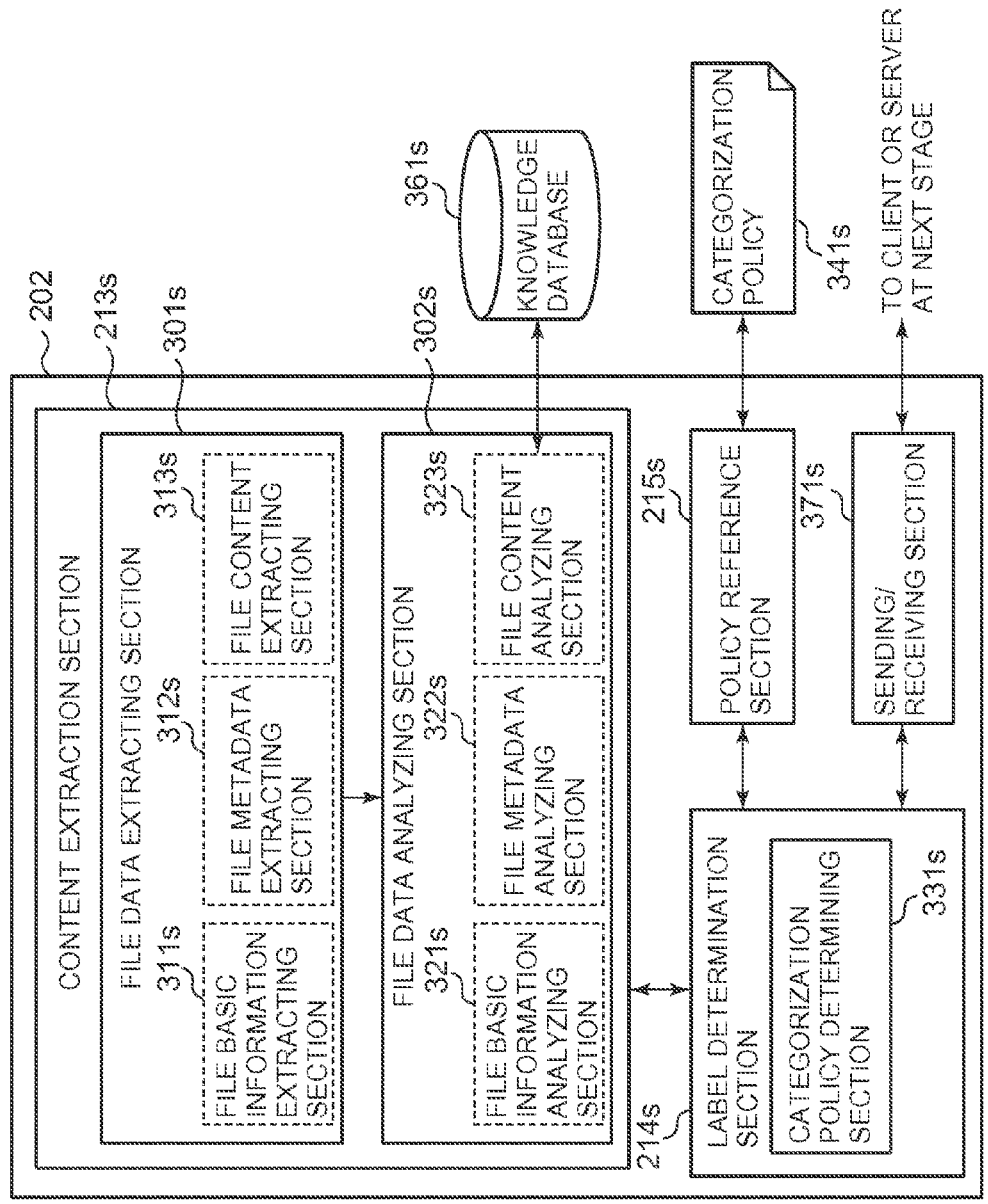
FIG. 3B is a functional block diagram showing a detailed configuration of a content extraction section and a label determination section included in a server computer shown in FIG. 2 and used in embodiments of the inventive subject matter.

FIG. 3B is a functional block diagram showing a detailed configuration of the content extraction section and the label determination section included in the server (202) shown in FIG. 2 and used in various embodiments.

Like the client (201), the server (202) includes a content extraction section (213s), and the content extraction section (213s) can include a file data extracting section (301s) and a file data analyzing section (302s).

Among the components in the client (201) shown in FIG. 2 and FIG. 3A, in some embodiments the server (202) has only to include components for categorization processing. Therefore, for example, the server (202) of some embodiments may not include the operation detection section (211), the access control section (212), the content display controlling section (216) and the content changing section (217), and the display of categorization status controlling section (351) or the display of notification message controlling section (352).

The content extraction section (213s) of the server (202) can further include a file data extracting section (301s) and a file data analyzing section (302s).

The file data extracting section (301s) can include a file basic information extracting section (311s), a file metadata extracting section (312s), or a file content extracting section (313s), or a combination of any of them.

The file basic information extracting section (311s) extracts basic information included in the data to be categorized and sent from the client (201) or a server as a node of the next stage.

The file metadata extracting section (312s) references a categorization policy (341s) acquired by a policy reference section (215s) to extract metadata included in the data to be categorized and sent from the client (201) or the server as the node of the next stage.

The file content extracting section (313s) references the categorization policy (341s) acquired by the policy reference section (215s) to extract content included in the data to be categorized and sent from the client (201) or the node of the next stage.

The file data analyzing section (302s) can include a file basic information analyzing section (321s), a file metadata analyzing section (322s), or a file content analyzing section (323s), or a combination of them, The file basic information analyzing section (321s) references the categorization policy (341s) acquired by the policy reference section (215s) to analyze basic information extracted by the file basic information extracting section (311s).

The file metadata analyzing section (322s) analyzes metadata extracted by the file metadata extracting section (312s).

The file content analyzing section (323s) analyzes a content extracted by the file content extracting section (313s). The file content analyzing section (323s) can be coupled to a knowledge database (361s).

A label determination section (214s) of the server (202) can include a categorization policy determining section (331s). The categorization policy determining section (331s) references the categorization policy (341s) acquired by the policy reference section (215s) to categorize the data to be categorized.

Further, the server (202) includes a sending/receiving section (371s) for sending the data to be categorized to a server (not shown) located at a (upper) node of the next stage, sending the categorization result to the client (201) or a lower server, and receiving the categorization result from an upper server (not shown).

Figure 4:
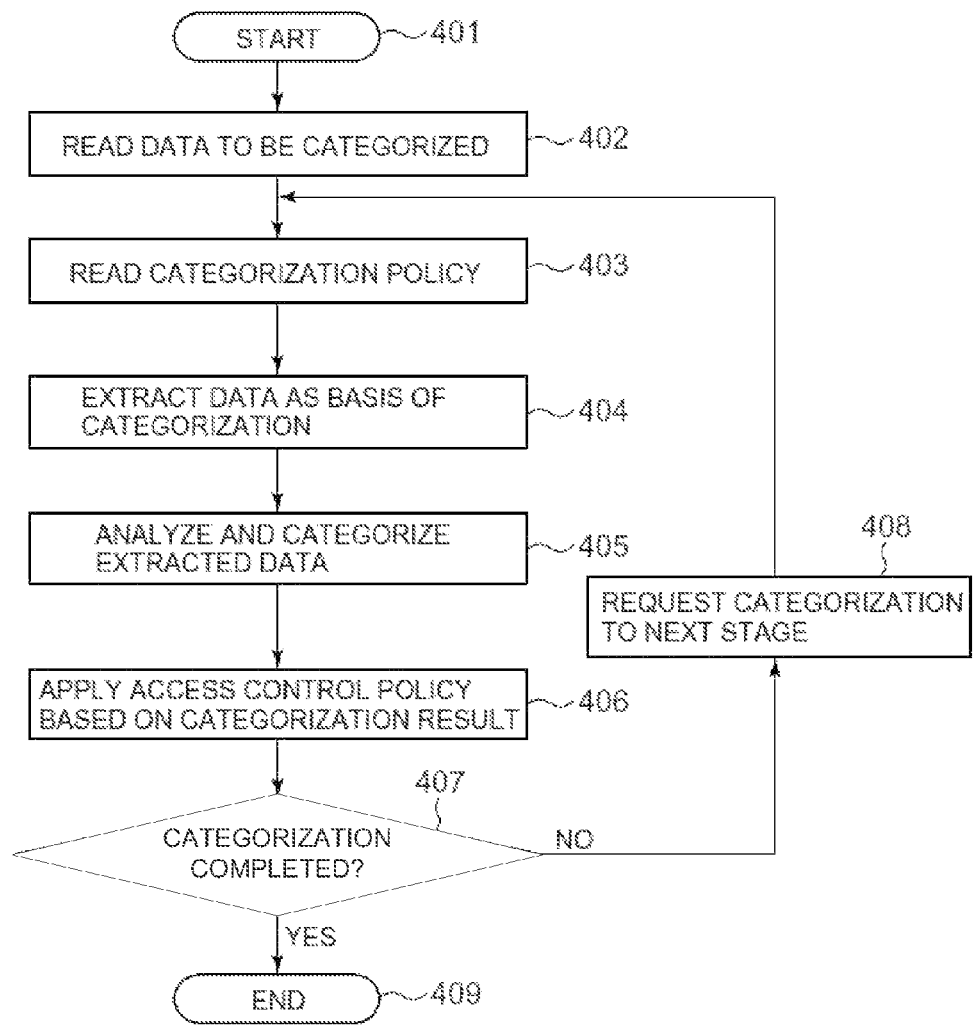
FIG. 4 is a flowchart of access control over a user action on data to be categorized according to embodiments of the inventive subject matter.

FIG. 4 is a flowchart of a method for performing access control over a user action on data to be categorized according to embodiments of the inventive subject matter.

At block 401, the client (201) performs categorization processing on data to be categorized to start an access control process. In some embodiments, this process can be started by using, as a trigger, a user action on the data.

At block 402, the operation detection section (211) detects a user operation on an application (231). Then, in response to the detection of the user operation, the operation detection section (211) specifies data as the target of the user operation (hereinafter also called "data to be categorized"). The user operation may be an operation, which, for example, could lead to the leakage of confidential or secret information. The operation is an action on a flow of data to be categorized, such as printout of the data to be categorized, copying or moving to an internal or external medium, copying to the clipboard, uploading to a network, mailing, or screen capturing. The printout can be output to a printer locally connected to the client (201), output to a printer connected to the network, or output to a printer placed on an affiliation basis (e.g., section or department), or output to a printer placed on another floor of a building. The copying to a medium can be burning onto a CD, a DVD, or a BD, or copying to an external medium (e.g. a semiconductor memory connected via USB, a hard disk, an express card memory, or an SD card). The mailing can be transmission of a mail to Which the data to be categorized is attached, for example. When the data to be categorized is specified, the operation detection section (211) passes the specified data to be categorized to the content extraction section (213). The content extraction section (213) reads the data to be categorized into the memory (103).

At block 403, the label determination section (214) reads the categorization policy (341) acquired by the policy reference section (215) into the memory (103) in response to the detection or the specification of the data to be categorized.

At block 404, the file data extracting section (301) in the content extraction section (213) extracts data as the basis of categorization from the data to be categorized or an attribute of the data to be categorized. As one example, the data as the basis of categorization can be, for example, any one of basic information extracted by the file basic information extracting section (311), metadata extracted by the file metadata extracting section (312), and content extracted by the file content extracting section (313), or a combination of them. As another example of the inventive subject matter, when the data to be categorized is a document file, the data as the basis of categorization can be, for example, a page, a paragraph, a chapter, text, an image or video, or a combination of them. The type of data the content extraction section (213) extracts from the data to be categorized can depend on the categorization rule. For example, when the computer is the client (201) or when data is extracted from the data to be categorized for the first time around, the data can be the directory name or the file name of the data to be categorized. The file data extracting section (301) passes the extracted data to the file data analyzing section (302) in the content extraction section (213).

At block 405, the file data analyzing section (302) in the content extraction section (213) references the categorization policy (341) read into the memory (103) at block 403 to analyze the data extracted by the file data extracting section (301). Then, the categorization policy determining section (331) uses the analysis result to categorize whether the extracted data belongs to a specific category.

At block 406, when the extracted data belongs to a specific category, the access control policy determining section (332) passes the process to the access control section (212). The access control section (212) applies the access control policy (342) to the user action on the data to be categorized. The access control section (212) can also instruct the categorization status controlling section (351) to display, on the GUI of the application (231), a message indicating that the data to be categorized is in the process of categorization (for example, see FIGS. 11B, 11C, and 11E). Further, the access control section (212) can instruct the notification message controlling section (352) to display, on the GUI of the application (231), a message indicating that an access restriction is imposed on the user action on the data to be categorized, or what kind of access restriction is imposed (for example, see FIGS. 11A, 11B, 11C, and 11D). In response to receiving the instruction, the categorization status controlling section (351) can display, on the GUI of the application (231), the message indicating that the data to be categorized is in the process of categorization. Further, in response to receiving the instruction, the notification message controlling section (352) can display, on the GUI of the application (231), the message indicating that an access restriction is imposed on the user action on the data to be categorized, or what kind of access restriction is imposed. As a result of the application of the access control policy (342), while the access control over the data to be categorized is "Pending," the user action on the data to be categorized is not permitted (i.e., the access is restricted) in some embodiments.

At block 407, the label determination section (214) determines whether the categorization of the data to be categorized is completed. If the data to be categorized is to be further categorized, the label determination section (214) proceeds to block 408, while if the data to be categorized is not to be categorized any more, the label determination section (214) proceeds to block 409 (exit operation).

At block 408, if the data to be categorized is to be further categorized, the label determination section (214) sends a categorization request to another computer (as a (upper) node of the next stage) (202) connected to the client (201) to further categorize the data. Note that, when the data to be categorized is to be further categorized, the label determination section (214) can categorize it on the client (201) itself again. For example, in a case where the client (201) is cut off from the network environment, the client may continue the categorization, in response to the transmission of the request, the processing returns to block 403. If the categorization at the next stage is performed on another computer (202), the label determination section (214s) and the content extraction section (213s) in the other computer (202) continue to perform the processing. On the other hand, if the categorization processing is performed again on the client (201) itself, the label determination section (214) and the content extraction section (213) in the client (201) continue to perform the processing.

At block 409, the client (201) ends the process for categorizing the data d performing access control.

Figure 5:
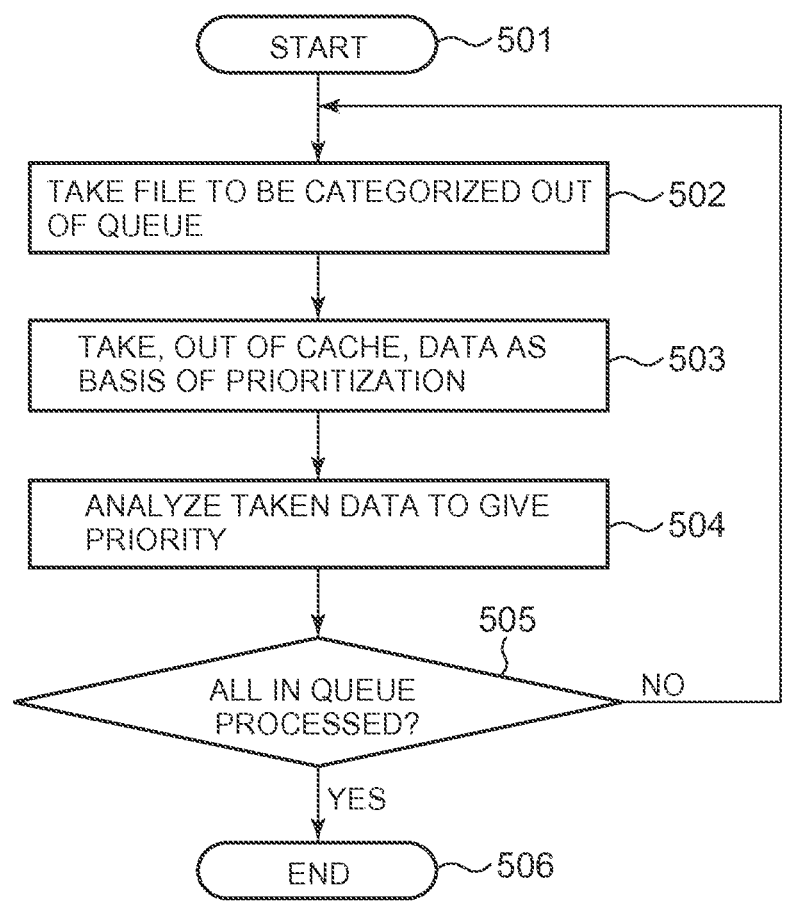
FIG. 5 is a flowchart for priority labeling used in embodiments of the inventive subject matter.

FIG. 5 is a flowchart for priority labeling according to embodiments of the inventive subject matter.

This processing may performed on a queue on a scan priority basis at predetermined intervals. The intervals may be different for the different queues.

At block 501, the label determination section (214) of the client (201) starts a process for priority labeling.

At block 502, the label determination section (214) takes one piece of data to be categorized out of a queue in which the data to be categorized is queued.

At block 503, the label determination section (214) takes, from the cache of the file data extracting section (301), data as the basis of prioritization. The data is the data extracted at block 404 of FIG. 4.

At block 504, the label determination section (214) analyzes the data taken from the cache and, according to the labeling policy, gives priority to the document file to be categorized.

At block 505, the label determination section (214) checks whether all pieces of data to be categorized in the queue have been processed. When all the pieces of data to be categorized in the queue have been processed, the label determination section (214) proceeds to block 506. On the other hand, when all the pieces of data to be categorized in the queue have not been processed yet, the label determination section (214) returns to block 502 to label priorities to all the pieces of data to be categorized.

At block 506, the label determination section (214) completes the process to perform priority labeling.

In the description of block 501 to block 506 the label determination section (214) of the client (201) takes the initiative in performing processing at each block. However, if the categorization processing at the next stage is performed on another computer (202), the label determination section (214s) of the other computer (202) will take the initiative in performing processing in each of block 501 to block 506.

Figure 6:
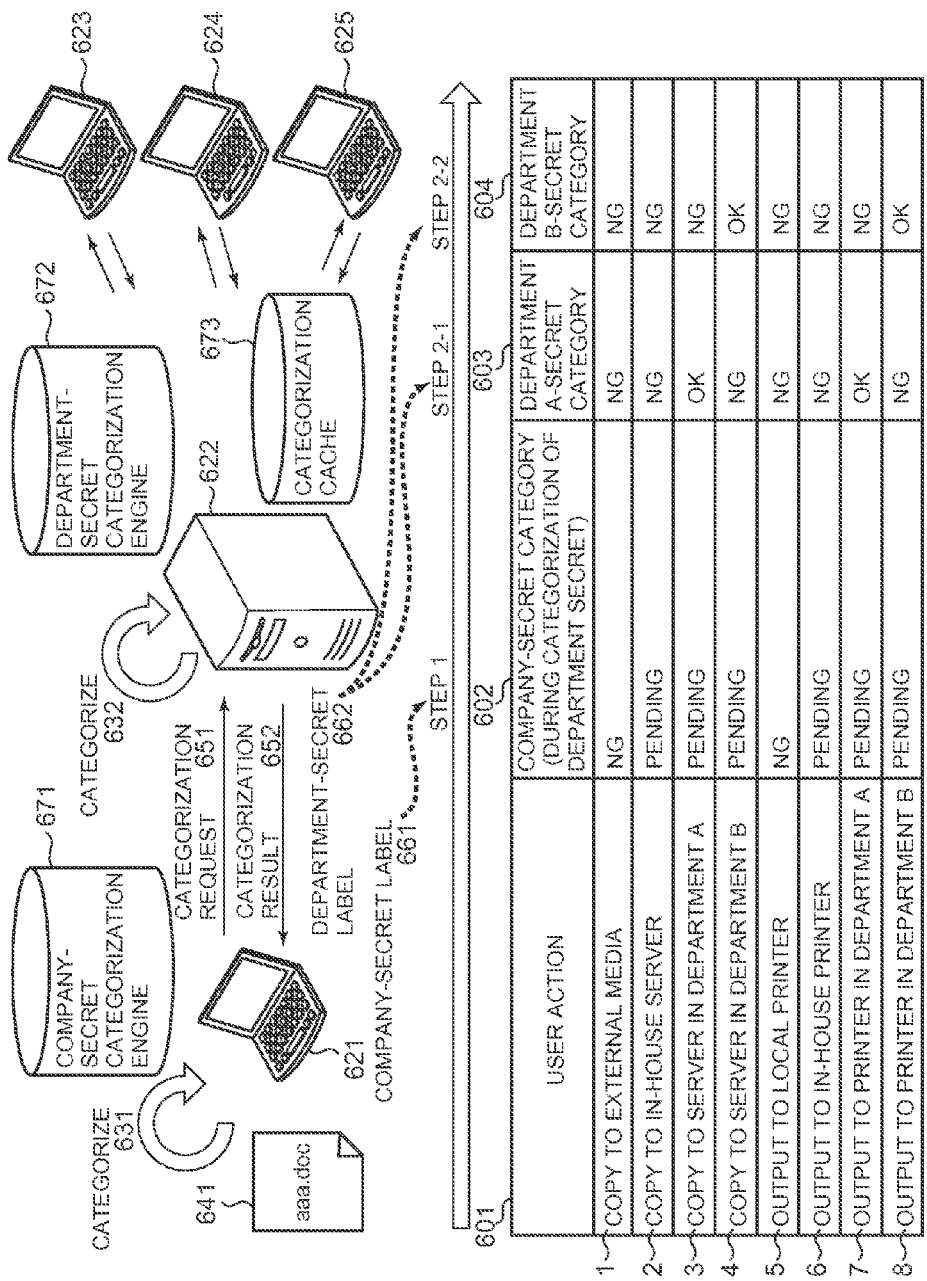
FIG. 6 is a diagram showing use of categorization engines for specific categories to perform categorization processing and access control dynamically on data to be categorized according to embodiments of the inventive subject matter.

FIG. 6 is a diagram showing use of categorization engines for specific categories to perform categorization processing and access control dynamically on data to be categorized according to various embodiments, Suppose that a user (not shown) is manipulating a document file "aaa.doc" (641) on an application on a computer of the user. Suppose further that the user performs a requested operation on the document file "aaa.doc" (641), For example, the requested operation is to copy or move the document file "aaa.doc" (641), or to output it to a printer.

In response to the detection of the requested operation, a computer (621) reads the document file "aaa.doc" (641) into a memory of the computer (621). According to a categorization policy, the computer (621) decides on which categorization engine the computer should make a request for processing. According to the categorization policy, the computer (621) uses a company-secret categorization engine (671) as a categorization engine for a specific category to extract data as the basis of categorization (hereinafter also called "first data" in this example) from the document file "aaa.doc" (641) or an attribute of the document file "aaa.doc" (641), and read it into the memory. The computer (621) analyzes the extracted first data. Then, the computer (621) uses the company secret categorization engine (671) to categorize 631 the document file "aaa.doc" (641). Next, when the document file "aaa.doc" (641) belongs to an access control policy (342) based on a company-secret category (hereinafter called "company-secret access control policy"), the computer (621) applies an access control set (hereinafter called "company-secret access control set") defined in the company-secret access control policy to user actions on the document file "aaa.doc" (641). The application results are shown as access control over user actions (611 to 618) as in a company-secret category (602) of a table (601). Note that the user actions shown in the table (601) are illustrative examples, and the inventive subject matter is not limited thereto. Specifically, Copy to External Media (611) and Output to Local Printer (615) are not permitted (NG). On the other hand, Copy to In-house Server (612), Copy to Server in Department A (613), Copy to Server in Department B (614), Output to In-house Printer (616), Output to Printer in Department A (617), and Output to Printer in Department B (618) are "pending" (it means that the document file is in the process of categorization).

Since there are "pending" items of access control over the document file "aaa.doc" (641), the computer (621) further uses another categorization engine to work on the categorization of the document file "aaa.doc" (641) (632). To this end, the computer (621) requests another computer (622) connected through a network to perform categorization processing (651). Thus, the computer (621) does not perform access control over the document file "aaa.doc" (641) by using the company-secret access control policy alone.

It is desirable, though not required, that the other computer (622) have processing power equivalent to or higher than that of the computer (621). The other computer (622) can have a server-client relationship with the computer (621). In the following, in order to facilitate understanding of the content, the computer (621) is called a client (621) and the other computer (622) is called a server (622). Note that the computer (621) and the other computer (622) may have a peer-to-peer relationship, rather than a client-server relationship.

The client (621) requests the server (622) to perform further categorization processing on the document file "aaa.doc" (641) (651). Upon making the request, the client (621) sends the document file "aaa.doc" (641) to the server (622).

The server (622) receives and reads the document file "aaa.doc" (641) into a memory of the server (622). The server (622) uses a department-secret categorization engine (672) as a categorization engine for a specific category (department A-secret categorization engine or department B-secret categorization engine) to extract data as the basis of categorization from the document file "aaa.doc" (641) or an attribute of the document file "aaa.doc" (641), and read it into the memory. Note that the data extracted in the server (622) is different from the data extracted in the client (621). The server (622) extracts the data as the basis of categorization (hereinafter also called "second data" in this example) from the document file "aaa.doc" (641) or the attribute of the document file "aaa.doc," and reads it into the memory. The second data can be data whose analysis takes more time than that of the first data. For example, when the first data is text, the second data can be image data or video data. The server (622) analyzes the second data. Then, the server (622) uses a department A-secret categorization engine (672) or a department B-secret categorization engine (672) to categorize 632 the document file "aaa.doc" (641).

The following will describe a case where the server (622) uses the department A-secret categorization engine (672).

The server (622) sends the client (621) the results 652 of categorization processing using the department A-secret categorization engine (672). The client (621) receives the categorization results. When the document file "aaa.doc" (641) belongs to an access control policy (342) associated with a department A-secret category, the client (621) applies an access control set (hereinafter called "department A-secret access control set") defined in the access control policy to user actions on the document file "aaa.doc" (641) (stage 2-1). The application results are shown as access control over the user actions (611 to 618) as in a department A-secret category (603) of the table (601). Specifically, since Copy to External Media (611) and Output to Local Printer (615) have already been decided not to be permitted (NG) by the application of the company-secret access control set, the department A-secret access control set is not applied to these user actions. In other words, Copy to External Media (611) and Output to Local Printer (615) are not updated by the department A-secret access control set. On the other hand, Copy to In-house Server (612), Copy to Server in Department B (614), Output to In-house Printer (616), and Output to Printer in Department B (618) are changed from Pending to NG (user action not permitted) as a result of the application of the department A-secret access control set. Further, Copy to Server in Department A (613) and Output to Printer in Department A (617) are changed from Pending to OK (user action permitted) as a result of the application of the department A-secret access control set.

The following will describe a case where the server (622) uses the department B-secret categorization engine (672).

The server (622) sends the client (621) the results 652 of categorization processing using the department B-secret categorization engine (672). The client (621) receives the categorization results. When the document file "aaa.doc" (641) belongs to an access control policy (342) associated with a department B-secret category (hereinafter called "department B-secret access control policy"), the client (621) applies an access control set defined in the access control policy to user actions on the document file "aaa.doc" (641) (stage 2-2). The application results are shown as access control over the user actions (611 to 618) as in a department B-secret category (604) of the table (601). Specifically, since Copy to External Media (611) and Output to Local Printer (615) have already been decided not to be permitted (NG) by the application of the company-secret access control set, the department B-secret access control set is not applied to these user actions. In other words, Copy to External Media (611) and Output to Local Printer (615) are not updated by the department B-secret access control set. On the other hand, Copy to In-house Server (612), Copy to Server in Department A (613), Output to In-house Printer (616), and Output to Printer in Department A (617) are changed from "Pending" to "NG" (user action not permitted) as a result of the application of the department B-secret access control set. Further, Copy to Server in Department B (614) and Output to Printer in Department B (618) are changed from "Pending" to "OK," (user action permitted) as a result of the application of the department B-secret access control set.

As discussed above, upon access control over user actions, the client (621) first performs categorization processing using the company-secret categorization engine (671) to apply an access control set defined in the access control policy (342) to the user actions. As a result of the application of access control, there exists such an intermediate state that some items of access control over user actions are "pending" (stage 1). Next, the server (622) performs categorization processing using the department A-secret categorization engine (672) or the department B-secret categorization engine (672) to apply an access control set defined in the access control policy (342) to the pending user actions. The categorization processing is repeated until use actions with an intermediate state of "pending" are resolved to a final state that determines whether the user actions are permitted or not (stage 2-1 and stage 2-2). Thus, the categorization processing, in some embodiments, can be performed on multistage nodes in a step-by-step basis so that the client (621) can perform categorization processing with low requirements for resources, and then the server (622) can perform categorization processing with high requirements for resources. Since the requirements for the resources of the client (621) to perform categorization processing are reduced in some embodiments, the usability of the client (621) is not reduced.

Further, since the client (621) performs provisional access control (pending), in some embodiments the client (621) can permit the user of the client (621) promptly to do user actions permitted in the categorization processing. In other words, this can prevent a situation where user operations cannot be earned out until access control over all the user actions is confirmed because of the presence of both an intermediate state such as "pending" and "OK" are indicative of permitted user actions in stage 1 in the middle of categorization processing. In this case, some user operations are carried out even if access control over all the user actions is not determined. This can prevent reduction in applications usability due to delay in the categorization processing. Further, since the client (621) performs provisional access control (e.g., actions with an access control state of "pending"), when the client (621) is in a situation that it cannot communicate with the server (622) (for example, in the case of trouble in the communication environment, or when the client (621) is under a physically limited environment in which communication cannot be performed), permission can be given promptly to the user of the client (621) to do user actions permitted in the categorization processing by the client (621) alone. In other words, even if the client (621) cannot or is difficult to perform categorization processing due to such limitations, access control over the user actions can be performed.

As shown in FIG. 6, the server (622) also performs categorization processing on data to be categorized in response to categorization requests from other clients (e.g. 623, 624, and 625). The server (622) can use categorization engines appropriate for respective data to be categorized.

The server (622) can include a categorization cache (673). The categorization cache (673) holds categorization results. When a cache hit occurs, the server (622) can return a categorization result cached in the categorization cache (673) to a client (which is not always the client (621) requesting the categorization result). Similarly, the client (621) can include a categorization cache (not shown).

Further, according to the embodiments, partially-categorized status can be provided to the user of the client (621) through the GUI as shown in FIG. 11.

The following will describe a technique using labeling further in the categorization processing and access control of data to be categorized according to the embodiments.

Upon applying the company-secret access control set to user actions on the document file "aaa.doc" (641), the client (621) can give a "company-secret label" to the categorization result. Then, upon applying the department A-secret access control set or the department B-secret access control set to user actions on the document file "aaa.doc" (641), the client (621) can label the categorization result as a "department-secret." When no new confidential label is given to a categorization result with the "company-secret label" given thereto, the pending access control is confirmed. For example, actions marked as "Pending" in the company-secret category (602) of FIG. 6 are permitted. Thus, according to the embodiments, intermediate steps are provided in the categorization processing so that a confidential label can be given on a step-by-step basis. Since the confidential label can be given on a step-by-step basis, appropriate access control based on the given confidential label can be performed.

Figure 7:
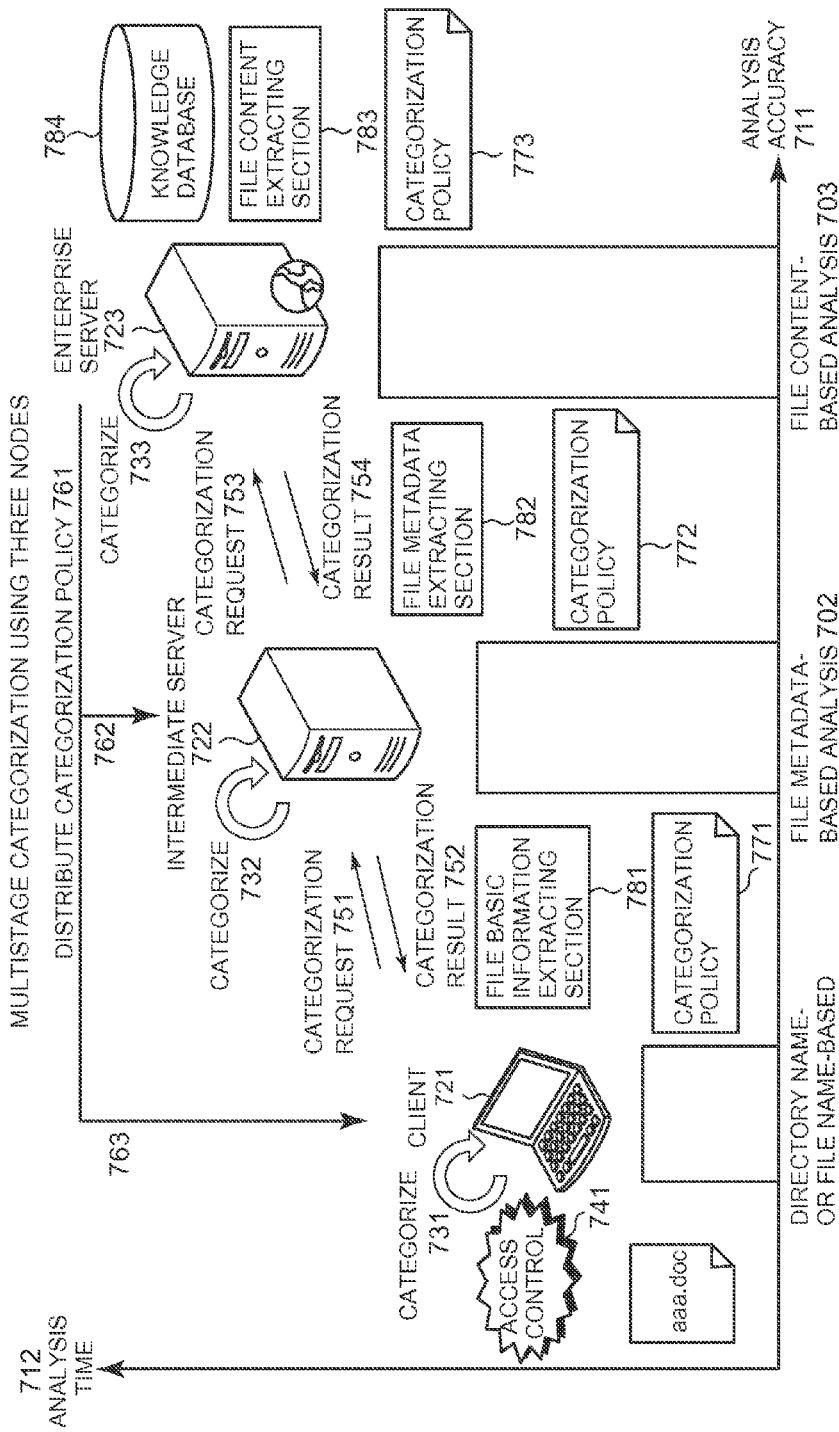
FIG. 7 is a diagram showing an example where categorization processing and access control are dynamically performed on data to be categorized through multistage categorization according to embodiments of the inventive subject matter.

FIG. 7 is a diagram showing a case where categorization processing and access control are dynamically performed on data to be categorized through multistage categorization according to the various embodiments.

FIG. 7 shows an example of three nodes. A computer (hereinafter called the "client") (721) of a user (not shown) is connected to an intermediate server (722) through a network. The intermediate server (722) is connected to an enterprise server (723) through a network. The client (721) may or may not be able to exchange data directly with the enterprise server (723), it is desirable, though not required, that the client (721), the intermediate server (722), and the enterprise server (723) should have higher processing power in this order. However, the processing power of the client (721), the intermediate server (722), and the enterprise server (723) may be equivalent to one another.

Suppose that the user is manipulating a document file "aaa.doc" (741) on an application on the client (721). Suppose further that the user has requested an operation on the document file "aaa.doc" (741). For example, the operation may be an operation to copy or move the document file "aaa.doc" (741), or to output it to a printer.

In response to the requested operation, the client (721) reads the document file "aaa.doc" (741) into a memory of the client (721). A file basic information extracting section (781) of the client (721) extracts data as the basis of categorization (hereinafter also called "first data" in this example) from the directory name or the file name of the document file "aaa.doc" (741), and reads it into the memory. A file basic information analyzing section (not shown) of the client (721) analyzes the first data. The directory name or the file name is, for example, a name including a proper noun (e.g. customer's name) or the updated date and time, or the file name, the file extension, or the updated date and time. The directory name- or file name-based analysis (701) enables an analysis of a CATIA (Computer graphics Aided Three dimensional Interactive Application) specific files. Then, the client (721) uses a categorization engine for the directory name-or file name-based analysis (701) to categorize the document file "aaa.doc" (741) (731). Next, when the document file "aaa.doc" (741) belongs to an access control policy (342) (hereinafter also called "first access control policy" in this example) associated with a category for the directory name or file name-based analysis (701), the client (721) applies an access control set (hereinafter also called "first access control set" in this example) defined in the access control policy (342) to user actions on the document file "aaa.doc" (741).

Since there are "pending" items of access control over the document file "aaa.doc" (741), the client (721) further uses a categorization engine of the intermediate server (722) to work on the categorization of the document file "aaa.doc" (741) (732). To this end, the client (721) requests the intermediate server (722) to perform categorization processing (751). In this case, the client (721) does not perform access control over the document file "aaa.doc" (741) equally by using the first access control policy alone. Upon making the request, the client (721) sends the document file "aaa.doc" (741) to the intermediate server (722).

The intermediate server (722) receives and reads the document file "aaa.doc" (741) into a memory of the intermediate server (722). A file metadata extracting section (782) of the intermediate server (722) extracts data as the basis of categorization (hereinafter also called "second data" in this example) from metadata of the document file "aaa.doc" (641), and reads it into the memory. A file metadata analyzing section (not shown) of the intermediate server (722) analyzes the second data. Then, the intermediate server (722) uses a categorization engine for file metadata-based analysis (702) to categorize the document file "aaa.doc" (741) (732). The intermediate server (722) returns the results of categorization processing to the client (721). When the document file "aaa.doc" (741) belongs to an access control policy (342) (hereinafter also called "second access control policy" in this example) associated with a category for the file metadata-based analysis (702), the client (721) applies an access control set (hereinafter also called "second access control set" in this example) defined in the access control policy (342) to the user actions on the document file "aaa.doc" (741) over which access control is "pending."

Since there are "pending" items of access control over the document file "aaa.doc" (741), the intermediate server (722) further uses a categorization engine of the enterprise server (723) to work on the categorization of the document file "aaa.doc" (741) (733). To this end, the intermediate server (722) requests the enterprise server (723) to perform categorization processing (753). In this case, the client (721) does not perform access control over the document file "aaa.doc" (741) equally by using the first and second access control policies alone. Upon making the request, the intermediate server (722) sends the document file "aaa.doc" (741) to the enterprise server (723).

The enterprise server (723) receives and reads the document file "aaa.doc" (741) into a memory of the enterprise server (723). A file content extracting section (783) of the enterprise server (723) extracts data as the basis of categorization (hereinafter also called "third data" in this example) from content of the document file "aaa.doc" (741), and reads it into the memory. A file content analyzing section (not shown) of the enterprise server (723) analyzes the third data using a knowledge database (784). The content is, for example, data in the file (e.g. text data, image data, or video data), in the analysis of the third data, data analysis or semantic analysis can be performed according to the structure of the document file "aaa.doc" (741) or the document structure. In the data analysis or semantic analysis, if there is a sentence saying, for example, "confidential information is not held" in the document file "aaa.doc" (741), the enterprise server (723) will distinguish this sentence from sentences actually including confidential information. Then, the enterprise server (723) uses a categorization engine for file content-based analysis (703) to categorize the document file "aaa.doc" (741)

(733). The enterprise server (723) returns the results of categorization processing to the client (721) through the intermediate server (722) or directly to the client (721) (754). When the document file "aaa.doc" (741) belongs to an access control policy (342) (hereinafter also called "third access control policy" in this example) associated with a category for the file content-based analysis (703), the client (721) applies an access control set (hereinafter also called "third access control set" in this example) defined in the access control policy (342) to the user actions on the document file "aaa.doc" (741) over which access control is "pending."

When the enterprise server (723) includes a policy server (also called a policy management server), the categorization policy can be distributed from the enterprise server (723) to the intermediate server (722), and to the client (721) (761). It is common practice to preregister the categorization policy with the policy server. The policy server updates the categorization policy as needed so that the updated categorization policy can be redistributed to registered destinations. Thus, the enterprise server (723) distributes the categorization policy to the intermediate server (722), and then to the client (721) (761). This enables a categorization policy managed by a business enterprise in an integrated fashion to be distributed from the center (i.e., from the enterprise server (723)).

As mentioned above, according to various embodiments, the client (721), the intermediate server (722), and the enterprise server (723) perform categorization processing in this order to perform access control over user actions. Further, at respective stages of the client (721), the intermediate server (722), and the enterprise server (723), access control policies (342) associated with different categories are applied. Since the categorization processing is performed on the client (721), the intermediate server (722), and the enterprise server (723) in this order, the analysis accuracy (711) is improved but the analysis time (712) becomes long. Therefore, in the case of trade-off between the analysis time and the analysis accuracy, the load on the analyzing site (each node of the client (721), the intermediate server (722), and the enterprise server (723)) can be balanced based on the current situation of the infrastructural environment to further improve usability. Thus, use of multiple stages like the client (721), the intermediate server (722), and the enterprise server (723) to perform categorization processing (hereinafter also called "multistage categorization") enables access control with appropriate accuracy and analysis time.

Further, the knowledge database (784) can be used to analyze the file content in the categorization processing on the enterprise server (723). Thus, since the knowledge database (784) as a specific database is used at a specific stage as the categorization processing on the enterprise server (723), processing necessary to analyze the data to be categorized can be performed separately from the client (721). In other words, even when input information on a categorization rule (for example, a word list of text (e.g. a dictionary), a knowledge database, or reference binary data) is available only at a specific location (e.g. when it cannot be taken out of the company), categorization processing that depends on the input information is separated from the client (721). This separated categorization processing is performed on a server performing the categorization processing to enable categorization processing using the input information on a categorization rule that is available only at a specific location.

Figure 8:
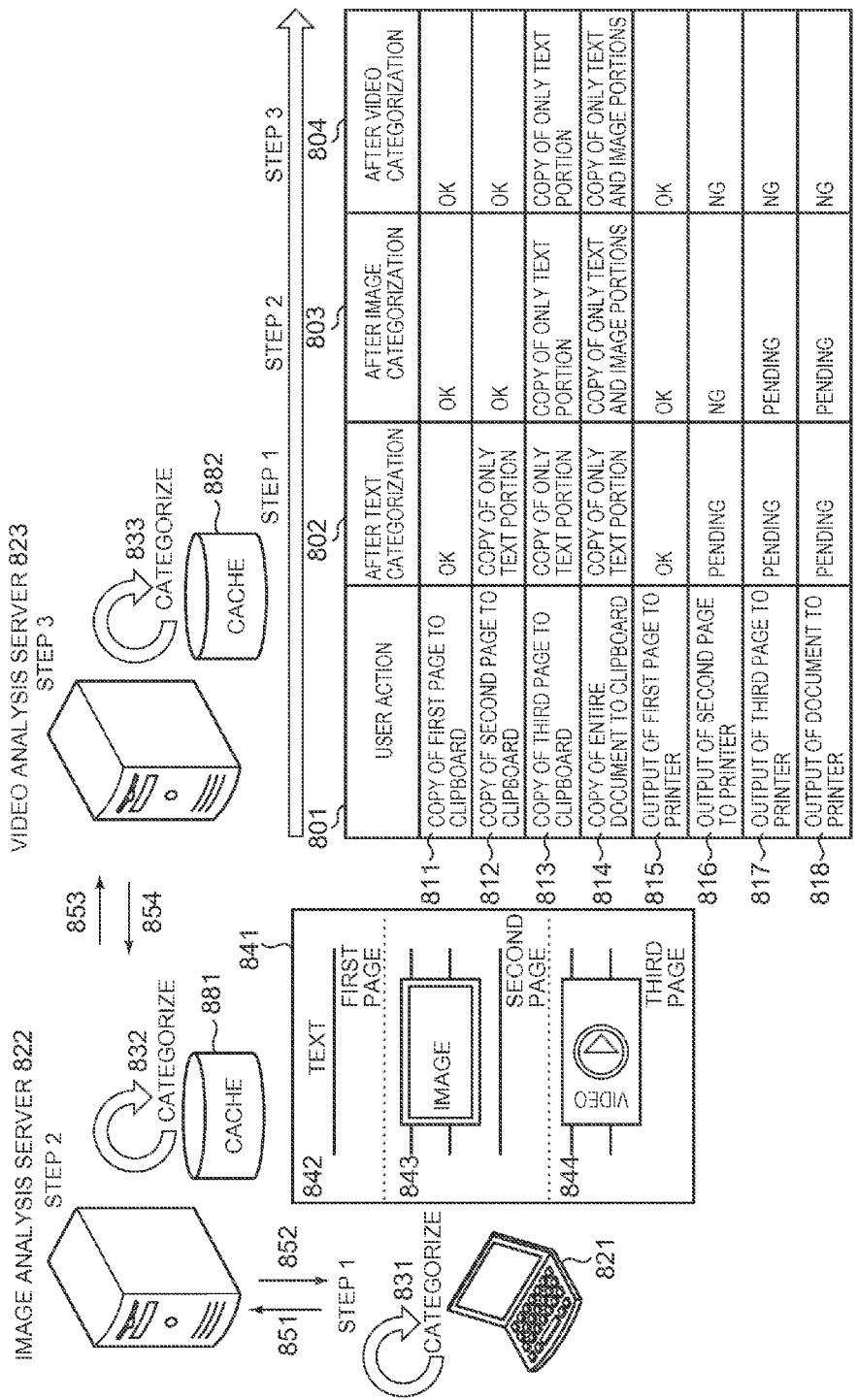
FIG. 8 is a diagram showing an example where data type-specific categorization is used to dynamically perform categorization processing and access control on data to be categorized according to embodiments of the inventive subject matter.

FIG. 8 is a diagram showing a case where data type-specific categorization is used to dynamically perform categorization processing and access control on data to be categorized according to various embodiments.

A computer (hereinafter called "client") (821) of a user (not shown) is connected to an image analysis server (822) and a video analysis server (823) if necessary through a network. The image analysis server (822) is connected to the video analysis server (823) through a network. It is desirable, though not required, that the client (821), the image analysis server (822), and the video analysis server (823) should have higher processing power in this order. However, the processing power of the client (821), the image analysis server (822), and the video analysis server (823) may be equivalent to one another.

Suppose that the user is manipulating a document file "bbb.doc" (841) on an application on the client (821). Suppose also that the document file "bbb.doc" (841) includes text data on the first page (842), text data and image data on the second page (843), and text data and video on the third page (844). Suppose further that the user has performed a requested operation on the document file "bbb.doc" (841). For example, the requested operation is to copy or move the document file "bbb.doc" (841), or to output it to a printer.

In response to detection of the requested operation, the client (821) reads the document file "bbb.doc" (841) into a memory of the client (821). A text information extracting section (not shown) of the client (821) uses a text data categorization engine to extract text data as the basis of categorization from the document file "bbb.doc" (841), and read it into the memory. A text data analysis section (not shown) of the client (821) analyzes the text data. Then, the client (821) uses the text data categorization engine to categorize the document file "bbb.doc" (841) (831). Next, when the document file "bbb.doc" (841) belongs to an access control policy (342) (hereinafter also called "text data access control policy") associated with a category for text data analysis the client (821) applies an access control set (hereinafter also called "first access control set") defined in the access control policy (342) to user actions on the document file "bbb.doc" (841).

The results of the application of the first access control set are shown as access control over user actions (811 to 818) as in "After Text Categorization" (802) of a table (801). Note that the user actions shown in the table (801) are illustrative examples, and the inventive subject matter is not limited thereto. Specifically, Copy of First Page to Clipboard (811) and Output of First Page to Printer (815) are permitted (OK). In regard to Copy of Second Page to Clipboard (812), Copy of Third Page to Clipboard (813), and Copy of Entire Document to Clipboard (814), copy of only the text portion is permitted. On the other hand, Output of Second Page to Printer (816), Output of Third Page to Printer (817), and Output of Entire Document to Printer (818) are "Pending." This is because image data and video data are included in the second page and the third page and categorization processing on the image data and the video data is not performed on the client (821).

Since there are "pending" items of access control over the document file "bbb.doc" (841), the client (821) further uses an image data categorization engine of the image analysis server (822) to work on the categorization of the document file "bbb.doc" (841) (732). To this end, the client (821) requests the image analysis server (822) to perform categorization processing (851). In this case, the client (821) does not perform access control over the document file "bbb.doc" (841) equally by using the text data access control policy (342) alone. Upon making the request, the client (821) sends the document file "bbb.doc" (841) to the image analysis server (822).

The image analysis server (822) receives and reads the document file "bbb.doc" (841) into a memory of the image analysis server (822). An image data extracting section (not shown) of the image analysis server (822) uses the image data categorization engine to extract image data as the basis of categorization from the document file "bbb.doc" (841), and read it into the memory. An image data analysis section (not shown) of the image analysis server (822) analyzes the image data. Then, the image analysis server (822) uses the image data categorization engine to categorize the document file "bbb.doc" (841) (832). The image analysis server (822) returns the results of categorization processing to the client (821) (852). When the document file "bbb.doc" (841) belongs to an access control policy (342) (hereinafter also called "second access control policy") associated with a category for image data analysis, the client (821) applies an access control set (hereinafter also called "second access control set") defined in the access control policy (342) to the user actions on the document file "bbb.doc" (841) over which access control is "pending."

The results of the application of the second access control set are shown as access control over user actions (811 to 818) as in "After Image Categorization" (803) of the table (801). Specifically, since Copy of First Page to Clipboard (811) and Output of First Page to Printer (815) are already permitted, they are not changed by the application of the second access control set. In regard to Copy of Second Page to Clipboard (812), the access control is updated by the application of the second access control set and the copy is permitted (OK). In regard to Copy of Entire Document to Clipboard (814), the access control is updated by the application of the second access control set, and copy of the image portion is permitted in addition to the text portion (note that copy of video is not permitted). In regard to Output of Second Page to Printer (816), the access control is updated by the application of the second access control set and the printer output is changed not to be permitted (NG).

In regard to Copy of Third Page to Clipboard (813), the access control is not changed by the application of the second access control set. In regard to Output of Third Page to Printer (817) and Output of Document to Printer (818), even after the second access control set is applied, the access control remains "Pending." This is because video data is included in the third page and categorization processing on the video data is not performed on the image analysis server (822).

Since there are "pending" items of access control over the document file "bbb.doc" (841), the image analysis server (822) further uses a video data categorization engine of the video analysis server (823) to work on the categorization of the document file "bbb.doc" (84( ) To this end, the image analysis server (822) requests the video analysis server (823) to perform categorization processing (853). In this case, the client (821) does not perform access control over the document file "bbb.doc" (841) equally by using the first and second access control policies alone. Upon making the request, the image analysis server (822) sends the document file "bbb.doc" (841) to the video analysis server (823).

The video analysis server (823) receives and reads the document file "bbb.doc" (841) into a memory of the video analysis server (823). A video data extracting section (not shown) of the video analysis server (823) uses a video data categorization engine to extract video data as the basis of categorization from the document file "bbb.doc" (841), and read it into the memory. A video data analysis section (not shown) of the video analysis server (823) analyzes the third data. Then, the video analysis server (823) uses the video data categorization engine to categorize the document file "bbb.doc" (841) (833). The video analysis server (823) returns the results of categorization processing to the client (821) through the image analysis server (822) (854 and 852) or directly to the client (821). When the document file "bbb.doc" (841) belongs to an access control policy (342) (hereinafter also called "third access control policy") associated with a category for video data analysis, the client (821) applies an access control set (hereinafter also called "third access control set") defined in the access control policy (342) to the user actions on the document file "bbb.doc" (841) over which access control is "pending."

The results of the application of the third access control set are shown as access control over user actions (811 to 818) as in "After Video Categorization" (804) of the table (801). Specifically, since Copy of First Page to Clipboard (811), Output of First Page to Printer (815), and Output of first Page to Printer (815) are already permitted and Output of Second Page to Printer (816) is already determined not to be permitted, the access control over these items is not changed by the application of the third access control set. In regard to Copy of Entire Document to Clipboard (814), the access control is updated by the application of the third access control set. However, since the copy of a video portion to the clipboard is not permitted, the content of access control over Copy of Entire Document to Clipboard (814) is not actually changed. In regard to Output of Third Page to Printer (817) and Output of Document to Printer (818), the access control is updated by the application of the third access control set so that they will be changed from "Pending" to "NG" (i.e., the user actions are not permitted).

The client (821) performs access control over the entire document within the bounds of possibility (e.g. on each data type) or keeps the access control pending until all the categorization results are returned from the respective servers.

Further, in response to the detection of the presence of each of image and video data in the document file "bbb.doc" (841), the client (821) can send categorization requests on a data type basis to the image analysis server (822) and the video analysis server (823). When the image analysis server (822) and the video analysis server (823) exist individually, the client (821) can send the categorization requests (853 and 855) to the image analysis server (822) and the video analysis server (823) at the same time. In such a case, when each individual categorization result is returned from the image analysis server (822) or the video analysis server (823), the client (821) can apply each individual access control set to user actions.

As mentioned above, according to various embodiments, computers for processing respective data types are provided for respective data types (text, image, and video) on a step-by-step basis, and this enables fine and elaborate action control over each individual data type.

In the example of FIG. 8, the description is made by taking a case of different data types as an example. In addition, according to various embodiments, even in the case of the same data type, the categorization processing and access control according to various embodiments are effective.

Suppose that the user of the client (821) starts a specific application. Suppose further that thousands of files are read upon starting the specific application. In such a case, it is not realistic that the client (821) will analyze the contents of all the thousands of files one by one. Therefore, the client (821) categorizes some of thousands of files (for example, files with a file size equal to or smaller than 100K), and requests another server (832 or 833) to categorize the remaining files (for example, files with a tile size greater than 100K). According to various embodiments, when the client (821) completes the categorization of some of the files, part of the user access can be permitted. This enables the user to perform some user actions in the middle of categorization processing without the need for the user to complete the categorization of all the thousands of files (i.e., when the client (821) completes the categorization of the some files).

Figure 9:
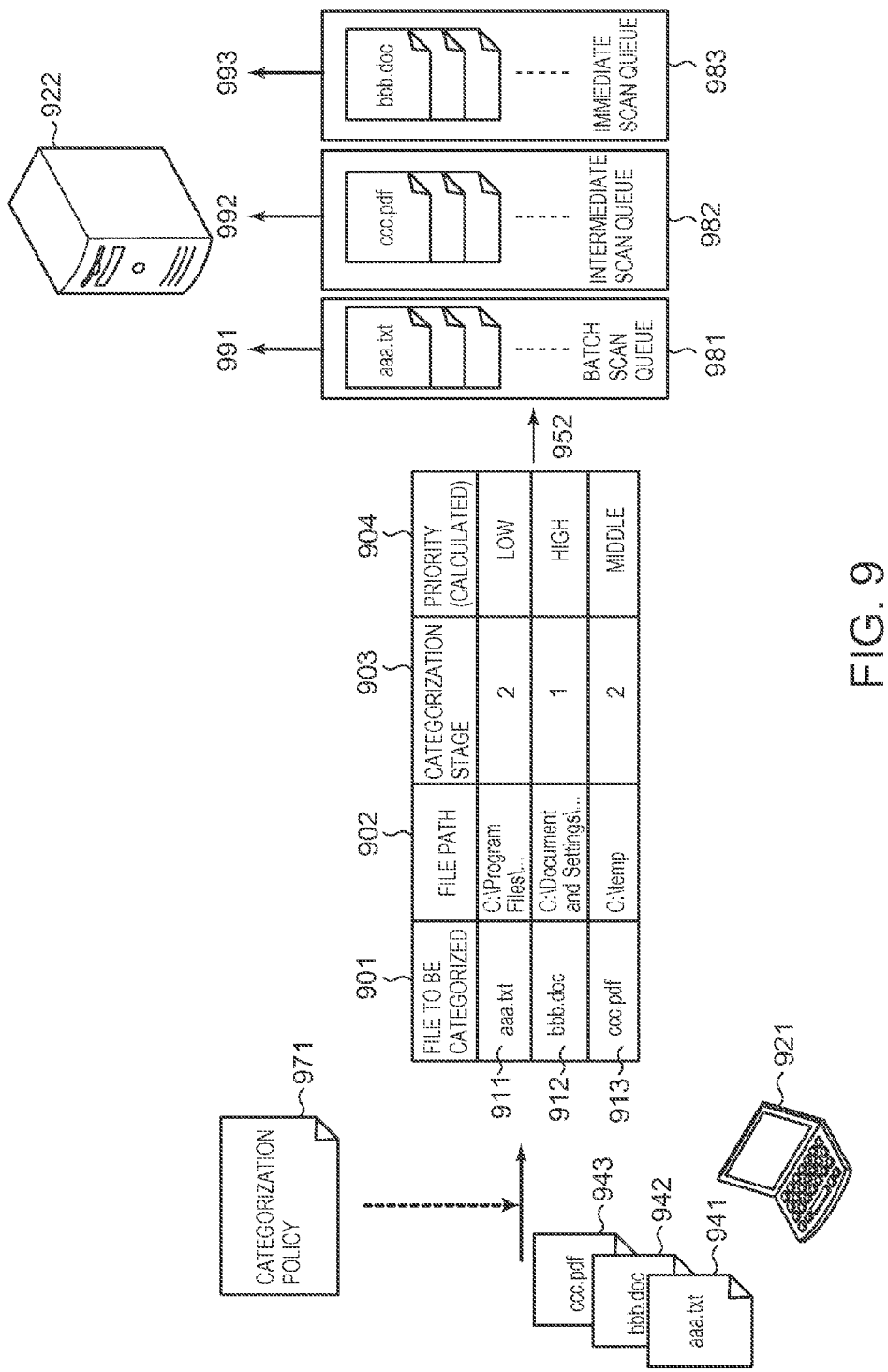
FIG. 9 is a diagram showing an example where access control is dynamically performed on data to be categorized by combining a technique for dynamically labeling priority to the data to be categorized with the technique for dynamically perform access control through the multistage categorization according to embodiments of the inventive subject matter.

FIG. 9 is a diagram showing a case where access control is dynamically performed on data to be categorized by combining a technique for dynamically labeling priority to the data to be categorized with the technique for dynamically performing access control through the multistage categorization according to various embodiments.

A computer (hereinafter called "client") (921) of a user (not shown) is connected to a server (922) through a network. Upon requesting a server at the next stage to perform categorization processing, the client (921) prioritizes data to be categorized (941, 942, and 943) using an attribute or the context thereof. As the prioritization method, for example, a technique disclosed in the specification of Japanese Patent Application No. 2010-212404 (filed on Sep. 22, 2010) by the present applicant can be employed. The entire contents of the specification of Japanese Patent Application No. 2010-212404 will be incorporated by reference herein.

The client (921) can set the priorities of data to be scanned for categorization processing based on the attributes or the context of the document. In other words, the client (921) can decide on the scan priority to perform categorization processing efficiently on multiple pieces of data. In the categorization processing for many pieces of data, this enables the client (921) to send the server (922) data sequentially in order from the highest priority in the categorization processing. The context is dynamic information such as ever-changing operating status. Therefore, the client (921) can dynamically change the scan priority to respond to the ever-changing needs of scans. As a result, the client (921) can update the priority of data in the categorization processing on a timely basis, and when access to data has occurred, an access control policy (342) can be applied immediately.

The client (921) reads data to be categorized (941, 942, and 943) into a memory. The data to be categorized (941) is a text file. The data to be categorized (942) is a document file. The data to be categorized (943) is a PDF (Portable Document Format) file. The client (921) extracts information on or the context of each of the data to be categorized (941, 942, and 943) to perform categorization processing according to a categorization policy (971). As a result, as shown in a table (901), the categorization stage and the scan priority are associated with each other for each of the data to be categorized. The client (921) can put each of the data to be categorized into a queue associated with scan priority. FIG. 9 lists three scan queues, namely an immediate scan queue (983), an intermediate scan queue (982), and a batch scan queue (981). Each of queued data to be categorized is sent to the server (922) according to the priority of each queue. This enables the server (922.) to process data to be categorized in order from the highest scan priority.

As mentioned above, according to various embodiments, an urgent or highly needed file is stored in a prioritized queue so that the file will be preferentially categorized, and this makes it possible to achieve appropriate and prompt access control over user actions.

In regard to a directory the user does not intentionally edit, for example, the client (921) can lower the priority of a categorization request to the next stage or intend not to make the categorization request. Further, suppose that the user is taking the client (921) out of the company, and during this period of time, document data is created and copied to a local storage device of the client (921). For this document data, it is deemed that only initial-stage categorization processing is completed. Then, when the client (921) is connected to the company's intranet, the categorization request for this document data can be placed preferentially in a queue (e.g. the immediate scan queue (983)) for categorization requests to the next stage.

Figure 10:
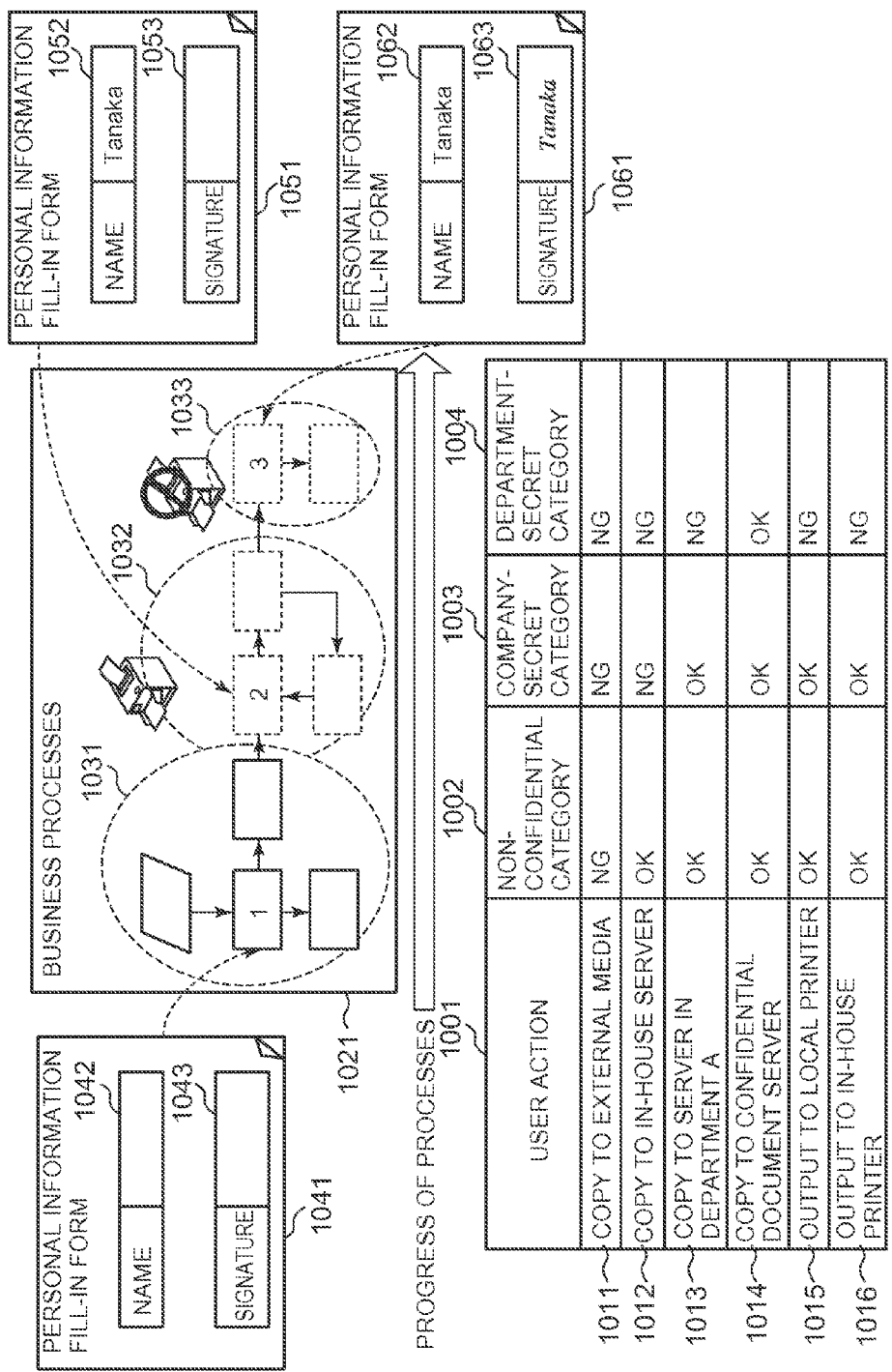
FIG. 10 is a diagram showing an example where categorization processing and access control according to various embodiments are applied to business processes to dynamically perform the categorization processing and access control on data to be categorized in units of business processes.

FIG. 10 is a diagram showing a case where categorization processing and access control according to various embodiments are applied to business processes to dynamically perform the categorization processing and access control on data to be categorized in units of business processes.

Software for business processes is, for example, an enterprise content management (ECM)/business process management (RPM) application such as IBM FileNet®. The ECM/BPM application is combined with the categorization processing and access control according to various embodiments to perform categorization processing in conjunction with the business processes in a step-by-step manner so that the categorization processing can be performed across all the processes.

For example, a business process such as to create a contract document or a document including personal information needs printing. The form of the document is not confidential. However, once data is written in the document, the document becomes a document including confidential information. Therefore, when processing the document, the client (201) can perform the categorization processing and access control according to various embodiments in combination of the business processes of creating the document.

A form (1041), a form (1051), and a form (1061) show modes of entering data in a contract document on a step-by-step basis according to business processes.

In a business process (1031), a blank form (1041) is read from a storage device. The form (1041) is a "personal information fill-in form" including respective fields of "Name" (1042) and "Signature" (1043). In the case of a blank form, the client (201) performs categorization processing on the file name of the form (1041) alone, and applies the first access control set. The results are shown in a non-confidential category (1002) of a table (1001). Specifically, among user actions (1011 to 1016), all user actions (1012 to 1016) are permitted except for Copy to External Media (1101).

In a business process (1032), name data is entered in the Name field (1042) of the blank form (1041). As a result, a name is entered in the form (1041) to update the form (1051). In the business process (1032), the form (1051) is printed out to prepare for a signature. The client (201) performs categorization processing at the next stage after the categorization processing performed in the business process (1031) on condition that there is data in the Name field (1052) but no signature in the Signature field (1053) of the form (1051), and applies the second access control set. The results are shown in a company-secret category (1003) of the table (1001). Specifically, Copy to In-house Server (1012) is updated from "OK" (Permitted) to "NG" (Prohibited). Since the form (1051) needs to be printed out to put a signature thereon, output to a printer is permitted even when the second access control set is applied.

In a business process (1033), a signature is put on the form (1051) with the name printed thereon. As a result, the signature is put in the Signature field of the form (1051) to update the form (1061). In the business process (1033), the form (1061) is scanned into a storage device of the client (201). The client (201) performs categorization processing at the next stage after the categorization processing performed in the business process (1032) on condition that there is data in the Name field (1062) and a signature in the Signature field (1063) of the form (1061), and applies the third access control set. The results are shown in a department-secret category (1004) of the table (1001). Specifically, Copy to Server in Department A (1013), Output to Local Printer (1015), and Output to In-house Printer (1016) are updated from "OK" (Permitted) to "NG" (Prohibited). In other words, since the form (1061) with a signature thereon needs to be confidential, output to printers (1015 and 1016) are prohibited after the third access control set is applied. Further, all copies (1011, 1012, and 1013) but Copy to Confidential Document Server (1014) are prohibited.

In the business process (1033), the description is made of the case where the client (201) performs categorization processing at the next stage after the categorization processing performed in the business process (1032) on condition that there is data in the Name field (1062) and a signature in the Signature field (1063) of the form (1061). In another mode, when the server (202) can reference a database holding preregistered signatures, the server (202) references the database holding preregistered signatures on condition that there is data in the Name field (1062) and a signature in the Signature field (1063) of the form (1061) to determine whether the signature in the Signature field (1063) is valid or invalid (equivalent to no signature). If the signature is valid, the server (202) may perform categorization processing at the next stage after the categorization processing performed in the business process (1033) and apply the third access control set.

FIG. 11 contains diagrams showing examples of displaying that categorization processing and access control are being dynamically performed on an application using a GUI according to various embodiments.

The client (201) can use a system tray or an application extension point (e.g. plug-in) to visually display in the middle of processing that categorization processing and access control are being dynamically performed according to various embodiments. As a technique for visually displaying the status of categorization processing and user actions permitted or not permitted or in the process of being subjected to categorization processing, a menu, a toolbar, a status bar, or a dialog box can be used. The following will illustrate examples of visually showing the status of categorization processing and user actions permitted or not permitted or in the process of being subjected to categorization processing.

FIG. 11A shows a print icon (1101) on a toolbar provided on the application.

Suppose that the user of the client (201) is editing a document file and wants to print it out. Suppose further that the number of printers available to the user is four. In this case, the user looks at the print icon (1101) on the application. Indicated on the print icon (1101) is a numeric value of "2" despite that the number of printers available to the user is four. Thus, from the numeric value on the print icon (1101), the user can know that the number of printers on which printing of the document file is permitted (the number of printers to which the file can be output) is two. Thus, the print icon (1101) enables the user to know or expect user actions permitted at the time even in the middle of categorization processing.

FIG. 11B shows a print window (1102) appearing when the user selects "print" by clicking on the print icon (1101) shown in FIG. 11A using a mouse or from a menu of the application.

The print window (1102) indicates that printers to which the user can output the document file to be printed out are "printer 1" (default printer) and "printer 2," and that, in regard to "In-house Printer" and "Printer in Department B," access control (determination on output availability) for printing the document file is in the state of "pending" (and in the process of categorization). Thus, the print window (1102) can dynamically display printers to which the document file can be output and that the categorization processing and access control are being performed according to various embodiments. The access control being in the state of "pending" means that categorization processing for the user action to print out the document file is still in progress in the background. The client (201) allows the user to use "printer 1" or "printer 2" to print out the document file without waiting until access control over all printers are determined despite that there are printers on which the determination on access control for printing the document file is in the state of "Pending." This enables the user to print out the document file using an available printer even during the process of categorization. Then, when access control over "In-house Printer" and "Printer in Department B" is determined, for example, the word "pending (during categorization of . . . )" may disappear to indicate that the document file can be printed out using "In-house Printer" and "Printer in Department B" (that the user access has been permitted), or the font color of the phrase "In-house Printer" or "Printer in Department B" may be changed from black to gray to indicate that printing using the "In-house Printer" and "Printer in Department B" is impossible (that the user access has not been permitted).

FIG. 11C shows a print window (1103) appearing when the user selects "Printer 1" in the print window (1102) of FIG. 11B and tries to print out the document file.

The print window (1103) includes items of "All," "Current Page," "Selected Portion," and "Pages Specified" as the print range of the document file. Here, suppose that the user has selected "All." In response to the selection, a message saying "Only the first page is printable (department A-secret A being categorized)" is displayed. This means that the first page can be printed on "Printer 1" but the pages that follow cannot be printed because categorization processing is being still performed in the background. Therefore, even when the user has checked the checkbox "All," only the first page can be printed out. However, according to various embodiments, if the user desires to print out only the first page, only the first page can be printed out without the need to wait until completion of the categorization processing in the background, thereby improving usability while retaining security. When access control for printing the first page and all the following pages of the document file is determined, the number or printable pages can be displayed as a message. Then, if all the pages become printable, the message will disappear from the screen.

In FIG. 11D, it is assumed that the user of the client (201) tries to store a file "aaa.doc" into directory "C:\temp\aaa.doc" of a local disk. In this case, the client (201) starts performing categorization processing on such a user action to store the file "aaa.doc" into the directory. However, when the categorization processing has not been completed yet, the client (201) displays a dialog box (1104) on the screen to let the user know that the categorization processing is being performed at present. The dialog box (1104) may disappear from the screen when the file "aaa.doc" becomes storable into the directory or after a predetermined period of time has elapsed.

FIG. 11E shows an example of a screen (1105) for presenting the categorization status to the user of the client (201) on the status bar of an application, The screen (1105) is a window screen appearing upon starting the application. The client (201) can dynamically display, on the status bar, the status of categorization processing for a file (active document) currently being edited on the screen (1105).

FIG. 12 shows an example of a categorization policy and an access control policy used in various embodiments.

A policy (1201) is an example of a categorization policy. For example, the categorization policy (1201) can be written in XML.

A policy (1202) is an example of an access control policy. For example, the access control policy (1202) can be written in XML.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), man optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium is not a signal.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general for categorizing data to perform access control as described herein may be implemented with facilities consistent with any hardware system or hardware systems. Many variations, modifications, additions and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter, in general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A system for categorizing data to perform access control, the system comprising:
 a first computing system configured to,
  receive first data, the first data comprising at least one of a portion of data to be categorized and metadata associated with the data to be categorized;

determine that the first data belongs to a first category;
in response to determination that the first data belongs to a first category, apply a first access control policy to actions on the data to be categorized;
determine that additional categorization of the data to be categorized is needed for one or more actions on the data to be categorized, wherein said making a determination that additional categorization of the data to be categorized is needed for the one or more actions comprises the first computing system being configured to at least one of,
determine that additional categorization of the data by the first computing system would take a length of time greater than a first threshold;
determine that additional categorization of the data by the first computing system would use resources of the first computing system greater than a second threshold; and
determine that the data is associated with a data type; and
in response to a determination that additional categorization of the data to be categorized is needed for the one or more actions, issue a request for the second computing system to categorize second data, the second data comprising at least one of a portion of the data to be categorized and metadata associated with the data to be categorized;
a second computing system coupled through a network with the first computing system,
the second computing system configured to,
receive at least one of the second data and an indication of the second data;
determine that the second data belongs to a second category;
in response to a determination that the second data belongs to a second category, apply a second access control policy to at least one action of the one or more actions.

2. The system according to claim 1, wherein
the first computing system includes a first categorization engine configured to categorize the first data according to a first categorization policy, and
the second computing system includes a second categorization engine configured to categorize the second data according to a second categorization policy.

3. The system according to claim 1, wherein
the first computing system comprises a client computing system configured to receive a selection of an action to be performed regarding the data to be categorized, and
the second computing system comprises at least one of an intermediate server and an enterprise server computing system.

4. The system according to claim 1, wherein the first computing system is further configured to permit execution of at least one action of the one or more actions prior to applying the second access control set to the action of the one or more actions.

5. A method comprising:
receiving, at a first computing system, at least one of data, an indication of the data, and metadata associated with the data, wherein the data is to be categorized;
determining a first category for a first part of the data based, at least in part, on at least one of the data, the indication of the data, and the metadata associated with the data;
applying a first access control policy to at least one of the first part of the data, a file associated with the first part of the data, and an operation associated with the first part of the data, wherein the first access control policy is associated with the first category;
determining that a second part of the data is not to be categorized by the first computing system, wherein said determining that the second part of the data is not to be categorized by the first computing system comprises at least one of,
determining that categorization of the second part of the data by the first computing system would take a length of time greater than a first threshold;
determining that categorization of the second part of the data by the first computing system would use resources of the first computing system greater than a second threshold; and
determining that the second part of the data is associated with a data type;
in response to said determining that the second part of the data is not to be categorized by the first computing system,
determining that a second computing system is indicated for categorization of the second part of the data; and
transmitting, from the first computing system, at least one of the second part of the data, an indication of the second part of the data, and metadata associated with the second part of the data to the second computing system;
receiving, from the second computing system, an indication of one of a second category or a second access control policy, wherein the second access control policy is associated with the second category;
applying the second access control policy to at least one of the second part of the data, a file associated with the second part of the data, and an operation associated with the second part of the data.

6. The method of claim 5, wherein the data type is one of text data, image data, audio data, and video data.

7. The method of claim 5 further comprising:
determining the first access control policy based, at least in part, on the first category.

8. The method of claim 5 further comprising:
in response to receiving, from the second computing system, the indication of the second category, determining the second access control policy based, at least in part, on the second category.

9. The method of claim 5, wherein
the second part of the data is embedded in the first part of the data.

10. The method of claim 5, wherein the first computing system is a mobile device and the second computing system is a server.

11. A computer program product for categorizing data to perform access control, the computer program product comprising:
a non-transitory computer readable storage medium having computer usable program code embodied therewith, the computer usable program code comprising a computer usable program code configured to,
detect at least one of data, an indication of the data, and metadata associated with the data, wherein the data is to be categorized;
determine a first category for a first part of the data based, at least in part, on at least one of the data, the indication of the data, and the metadata associated with the data;
apply a first access control policy to at least one of the first part of the data, a file associated with the first part of the data, and an operation associated with the first part of the data, wherein the first access control policy is associated with the first category;

determine that a second part of the data is not to be categorized, wherein said program code configured to determine that the second part of the data is not to be categorized comprises program code configured to at least one of, determine that categorization of the second part of the data would take a length of time greater than a first threshold;

determine that categorization of the second part of the data would use resources greater than a second threshold; and determine that the second part of the data is associated with a data type;

in response to a determination that the second part of the data is not to be categorized, determine that a first computing system is indicated for categorization of the second part of the data; and transmit at least one of the second part of the data, an indication of the second part of the data, and metadata associated with the second part of the data to the first computing system:

detect an indication of one of a second category or a second access control policy, wherein the second access control policy is associated with the second category; and apply the second access control policy to at least one of the second part of the data, a file associated with the second part of the data, and an operation associated with the second part of the data.

12. The computer program product of claim 11, wherein the data type is one of text data, image data, audio data, and video data.

13. The computer program product of claim 11, wherein the computer usable program code is further configured to:
determine the first access control policy based, at least in part, on the first category.

14. The computer program product of claim 11, wherein the computer usable program code is further configured to:
in response to a detection of an indication of the second category,
determine the second access control policy based, at least in part, on the second category.

15. The computer program product of claim 11, wherein the
the second part of the data is embedded in, the first part of the data.

16. An apparatus comprising:
a processor; and
a computer readable storage medium coupled to the processor, the computer readable storage medium having computer usable program code embodied therewith, the computer usable program code executable by the processor to cause the apparatus to, detect at least one of data, an indication of the data, and metadata associated with the data, wherein the data is to be categorized;

determine a first category for a first part of the data based, at least in part, on at least one of the data, the indication of the data, and the metadata associated with the data;

apply a first access control policy to at least one of the first part of the data, a file associated with the first part of the data, and an operation associated with the first part of the data, wherein the first access control policy is associated with the first category;

determine that a second part of the data is not to be categorized by the apparatus, wherein said program code being executable by the processor to cause the apparatus to determine that the second part of the data is not to be categorized by the apparatus, comprises program code executable by the processor to cause the apparatus to at least one of, determine that categorization of the second part of the data would take a length of time greater than a first threshold;

determine that categorization of the second part of the data would use resources greater than a second threshold; and determine that the second part of the data is associated with a data type;

in response to a determination that the second part of the data is not to be categorized by the apparatus, determine that a computing system is indicated for further categorization of the second part of the data; and transmit at least one of the second part of the data, an indication of the second part of the data, and metadata associated with the second part of the data to the computing system;

detect an indication of one of a second category or a second access control policy, wherein the second access control policy is associated with the second category;

apply the second access control policy to at least one of the second part of the data, a file associated with the second part of the data, and an operation associated with the second part of the data.

17. The apparatus of claim 16, wherein the data type is one of text data, image data, audio data, and video data.

18. The apparatus of claim 16, wherein the computer usable program code is further executable by the processor to cause the apparatus to:
in response to a detection of an indication of the second category;
determine the second access control policy based, at least in part, on the second category.

19. The apparatus of claim 16, wherein the
the second part of the data is embedded in the first part of the data.

\* \* \* \* \*